US006636327B2

(12) United States Patent
Yoshida et al.

(10) Patent No.: US 6,636,327 B2
(45) Date of Patent: Oct. 21, 2003

(54) IMAGE PROCESSING APPARATUS AND METHOD

(75) Inventors: Hiroyoshi Yoshida, Fujisawa (JP); Akimaro Yoshida, Yokohama (JP); Satoshi Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,360

(22) Filed: Dec. 2, 1998

(65) Prior Publication Data

US 2002/0159087 A1 Oct. 31, 2002

(30) Foreign Application Priority Data

Dec. 4, 1997 (JP) .............................. 9-348691
Dec. 16, 1997 (JP) .............................. 9-363269
Dec. 27, 1997 (JP) .............................. 9-369045

(51) Int. Cl.$^7$ .............................................. G06F 15/00
(52) U.S. Cl. ....................................... 358/1.15; 358/1.1
(58) Field of Search ................................ 358/1.1, 1.13, 358/1.14, 1.15, 405, 442, 412, 436, 439, 434, 435, 501, 468; 710/8, 14, 15, 17, 16, 62, 64, 72

(56) References Cited

U.S. PATENT DOCUMENTS 6,252,672 B1 * 6/2001 Sugawara et al. ......... 358/1.15

* cited by examiner

*Primary Examiner*—Arthur G. Evans

(74) *Attorney, Agent, or Firm*—Fitzpatrick, Cella, Harper & Scinto

(57) ABSTRACT

An image processing apparatus is controlled in accordance with the status of an interface and the contents of data. Specifically, so long as the number J of jobs, which are executed by the copier system at the same time, and the number N of channels, which are required by a target job during one cycle, are obtained, dynamic paper feeding timing Wd can be acquired from ideal paper feeding timing Ws, while taking delay time X into account. The preceding paper feeding is performed using paper feeding timing Wd.

Further, based on predicted data, a check is performed to determine whether image transmission will be successful without a buffer memory being used. When it is determined that the buffer memory is not required for the image transmission, image data are received without the buffer memory being obtained. When it is determined that the buffer memory is required for the image transmission, an adequate buffer memory is acquired for the reception of image data.

In addition, a check is performed to determine whether the height of an obtained bandwidth is satisfactory. When it is determined that the height of the bandwidth is satisfactory, a printer engine is so controlled that it performs printing at the maximum process speed (minimum paper interval).

32 Claims, 29 Drawing Sheets

IMAGE PROCESSING APPARATUS AND METHOD

BACKGROUND OF THE INVENTION

1. Field of the Invention

The present invention relates to an image processing apparatus connected to an IEEE 1394 serial bus, etc., and an image processing method therefor.

2. Related Background Art

Various image processing apparatuses and systems are known that transmit command statuses via a serial bus to a plurality of modules or to a plurality of apparatuses.

In addition, for the transmission of binary monochromatic image data, which have a small volume, image processing apparatuses that transmit image data and command statuses via a serial bus are well known.

Furthermore, there is a well known, commonly employed technique for outputting data to an image processing apparatus that employs a standardized interface, such as a SCSI (Small Computer System Interface) or a centronics.

However, when the data to be transmitted is color image data, which has a large volume, the conventional transmission of such data performed via a serial bus is not practical because an extended period of time is required.

This problem can be resolved to a degree by increasing the transmission speed of the serial bus. However, for an image processing apparatus, such as a copier, for which real-time image data transmission is required, the intermittent command status transmissions that occur interfere with the transmission of image data. Thus, it is difficult to employ a serial data bus, since the time by which the transmission of image data can be completed can not reliably be ascertained. As a result, a dedicated parallel bus must be used for image data transmissions.

On the other hand, since there is an increased demand for a reduction in the sizes of such products as copiers, which are generally used in offices, and a concurrent request that their functions be improved, not enough space is available inside these common office products to accommodate a dedicated parallel bus for the communication of image data.

Furthermore, the conventional image data transmission protocol for the transmission of image data via a serial bus is limited to a single protocol that is peculiar to an individual company that manufactures image processing apparatuses, so that the expansion property of the protocol is inferior.

Therefore, a technique has been proposed by which image data would be transmitted by employing an interface such as an IEEE 1394-1995 high performance serial bus (hereinafter referred to as an IEEE 1394) that can be used to connect together various types of apparatuses.

However, if with the IEEE 1394 standards an image data transmission source can not successfully perform an isochronous transmission for which a transmission time can be reliably ascertained, the transmission of the image data will fail.

In addition, if because of an inherent problem affecting the image processing apparatuses produced by a manufacturing company the IEEE 1394 standards can not provide complete coverage for those apparatuses, the protocol that tends to be employed is one that is peculiar to the specific manufacturing company.

SUMMARY OF THE INVENTION

To resolve the above shortcomings, it is one objective of the present invention to provide an image processing apparatus that can perform the steady, high speed transmission of image data via a single serial bus, even when command statuses and a large quantity of color image data must be transmitted, or even when conflicts develop among a plurality of jobs, and to provide a timing controlled operating method therefor.

It is another objective of the present invention to provide an image data transmission compensation method and system for compensating for the transmission of image data and, accordingly, for improving the reliability of an image processing apparatus.

It is an additional objective of the present invention to provide an image data transmission compensation method and system wherein, for the transmission of image data via a system bus, an inherent problem affecting the operation of an image processing apparatus can be resolved based on the protocol standards, and the expansion property can be improved.

To achieve the above objectives, according to the present invention an image processing apparatus, for which a plurality of modules are connected together via a high-speed serial bus along which at least one isochronous packet and at least one asynchronous packet, which are assigned for a predetermined number of channels, can be sequentially transmitted during a single transmission cycle, and by which image data can be transmitted to the plurality of modules by assigning to the isochronous packet the transmission to the modules of image data and by assigning to the asynchronous packet the transmission of a command status, comprises:

determination means for determining whether the number of channels available in one cycle is adequate for the execution of a job that includes the transmission of image data;

delay time prediction means for, when the determination means ascertains that the number of channels available is not adequate, predicting a delay time for the time required before the transmission of the image data included in the job is completed; and change means for dynamically changing an operating timing for a destination module for the image data in accordance with the delay time that is predicted by the delay time prediction means.

In addition, to achieve the above objectives, an image data transmission compensation method according to the present invention, for an image processing apparatus that is connected via a common serial bus, comprises:

an image data transmission prediction step, performed at an image data transmission source before transmission of image data to the image processing apparatus and in accordance with a transmission method for ascertaining a data transmission time using the common serial bus, of predicting whether or not transmission of the image data can be performed successfully;

a prediction result transmission step of transmitting to the image processing apparatus the results obtained at the image data transmission prediction step; and a reception method change step of changing an image data reception method based on the results received by the image processing apparatus.

Furthermore, to achieve the above objectives, an image data transmission compensation method according to the present invention, for an image processing apparatus connected via a common serial bus, comprises:

a first protocol execution step of executing the initial protocol that is not related to the protocol type of the image processing apparatus; and a second protocol execution step, following the execution of the initial protocol, of executing a protocol inherent to a plurality of image processing apparatus types.

DETAILED DESCRIPTION OF THE PREFERRED EMBODIMENTS

First Embodiment

A first embodiment of the present invention will now be described while referring to the accompanying drawings.

In this embodiment, the IEEE 1394-1995 (hereinafter referred to simply as a 1394 serial bus) is adopted as the digital interface to be used for connecting an image processing apparatus and other apparatuses.

An explanation will be given for the 1394 serial bus. In response to the introduction of digital VCRs and DVD players for public use, support is being requested for the real-time transmission of large amounts of such data as video data and audio data. In order to respond to this request, a fast data transmission interface is required across which video data and audio data can be transmitted and fetched in real time by a personal computer. Further, in order to transmit data to another digital apparatus, a fast data transmission interface is desired that has a requested transmission function. It is with such a viewpoint in mind that the 1394 serial bus was developed.

Figure 1:
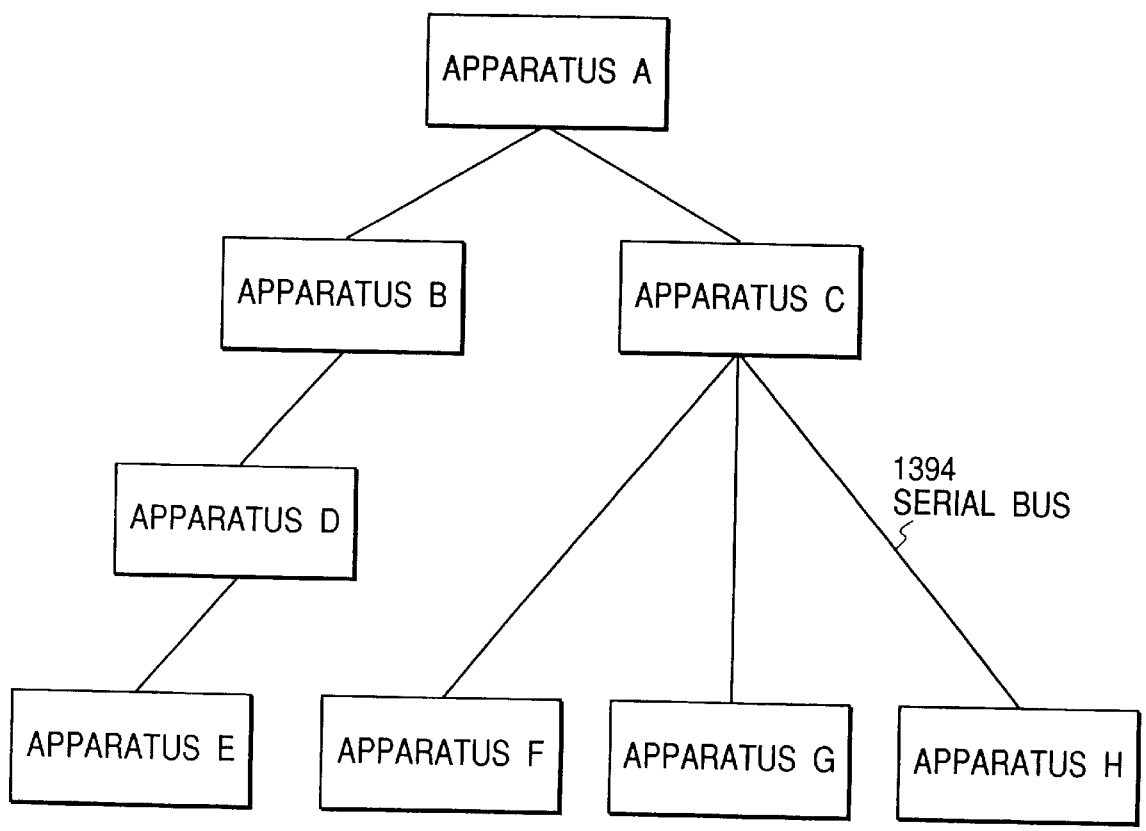
FIG. 1 is an explanatory diagram showing one example network system using the IEEE 1394-1995 (1394 serial bus) according to a first embodiment of the present invention.

FIG. 1 is a diagram for explaining an example network system constituted by using the 1394 serial bus.

The network system includes digital apparatuses A through H, a twisted pair cable composed of a 1394 serial bus connecting apparatuses A and B, B and D, D and E, C and F, C and G, and C and H. These digital apparatuses A to H are, for example, a personal computer, a digital VTR, a DVD player, a digital camera, a hard disk drive, a monitor, and a tuner.

A combination of the daisy chain method and the node branching method can be employed for connecting the digital apparatuses A to H, so that a connection having a high degree of freedom can be obtained.

The digital apparatuses A to H have their inherent IDs, and mutually identify the IDs constituting a network in the range within which they are connected by the 1394 serial bus. The digital apparatuses A to H serve as relays simply by being connected in sequence using a single 1394 serial bus cable, and the entire configuration constitutes a single network. The 1394 serial bus has a "Plug&Play function", i.e., a function for, when the cable is connected to an apparatus, automatically identifying the apparatus type and the connection state.

When an apparatus is deleted from the network system in FIG. 1, or a new apparatus is added thereto, the 1394 serial bus is automatically reset, the previous network function is reset, and a new network is built. Because of this function, the configuration of the network can always be maintained and the components identified.

The data transmission speeds are 100 Mbps, 200 Mbps and 400 Mbps, and for compatibility, an apparatus having a higher transmission speed can support an apparatus having a lower transmission speed.

The data transmission modes are the asynchronous transmission mode for the transmission of asynchronous data, such as control signals, and the isochronous transmission mode for the transmission of synchronous data, such as video data and audio data. After a cycle start packet (hereinafter referred to as a "CSP") that indicates the start of the cycle has been transmitted, asynchronous data and isochronous data are transmitted together in a single cycle (normally a cycle is 125 micro seconds), with the transmission of isochronous data taking place before the transmission of the asynchronous data.

Figure 2:
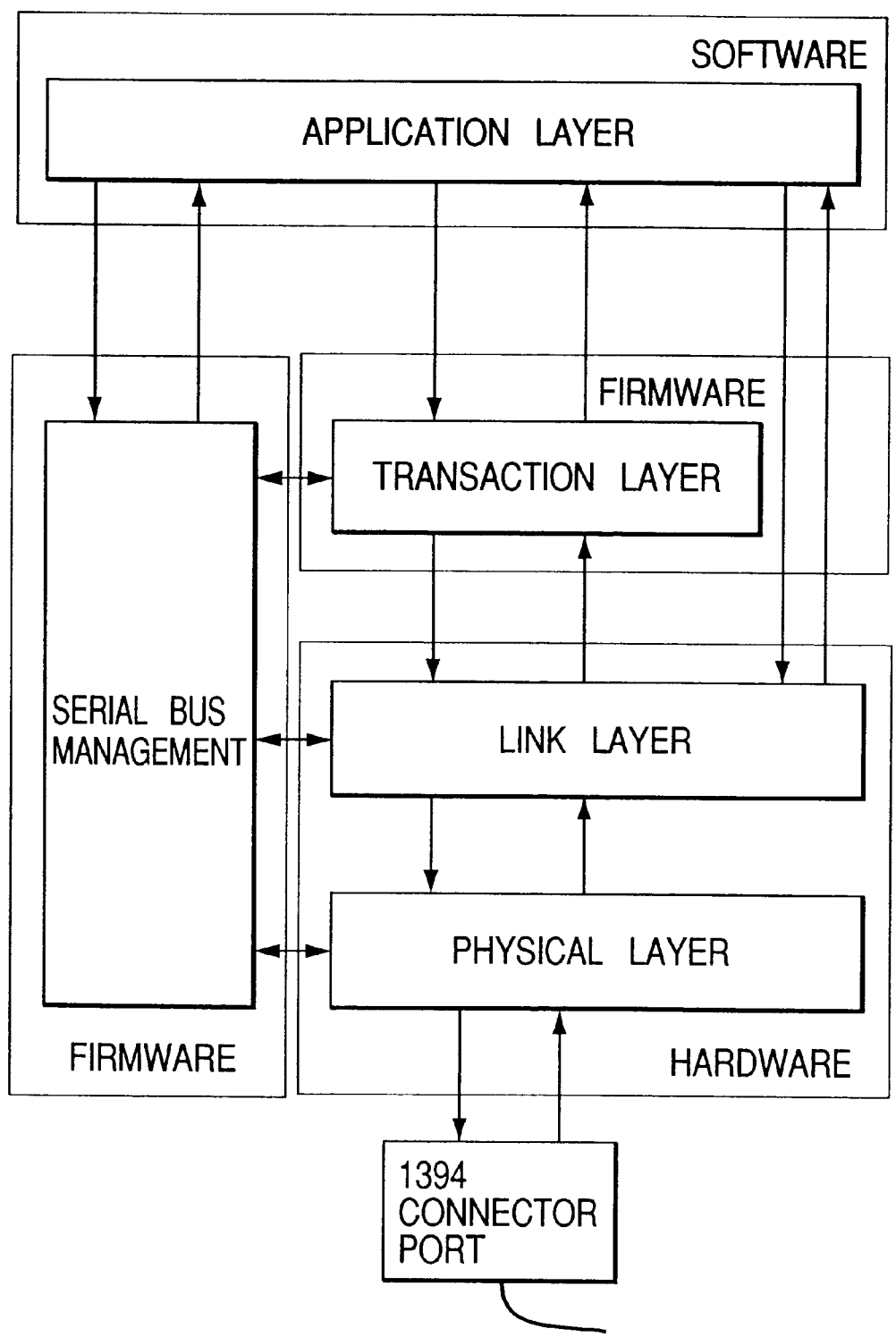
FIG. 2 is an explanatory diagram showing the structure of the 1394 serial bus.

FIG. 2 is an explanatory diagram showing the structure of the 1394 serial bus.

As is shown in FIG. 2, the 1394 serial bus has a hierarchical (a layered) structure. For the 1394 serial bus, a physical layer and a link layer that together constitute a hardware portion are positioned above a connector port whereat is attached the connector of the cable.

The hardware portion is substantially an interface chip, the physical layer performing the encoding and exercising the control associated with a connector, and the link layer performing the transmission of packets and providing the control for a cycle time.

A transaction layer in a firmware portion manages the data for a transaction and issues Read, Write and Lock commands. A management layer manages the connection statuses of the linked apparatuses and the IDs, and also manages the configuration of the network.

The hardware and the firmware portions substantially constitute the structure of the 1394 serial bus.

An application layer in a software portion, which differs depending on which software is to be used, specifies how data should be transmitted across the interface, and, for example, specifies a printer and the AVC protocol.

The structure of the 1394 serial bus has been explained.

Figure 3:
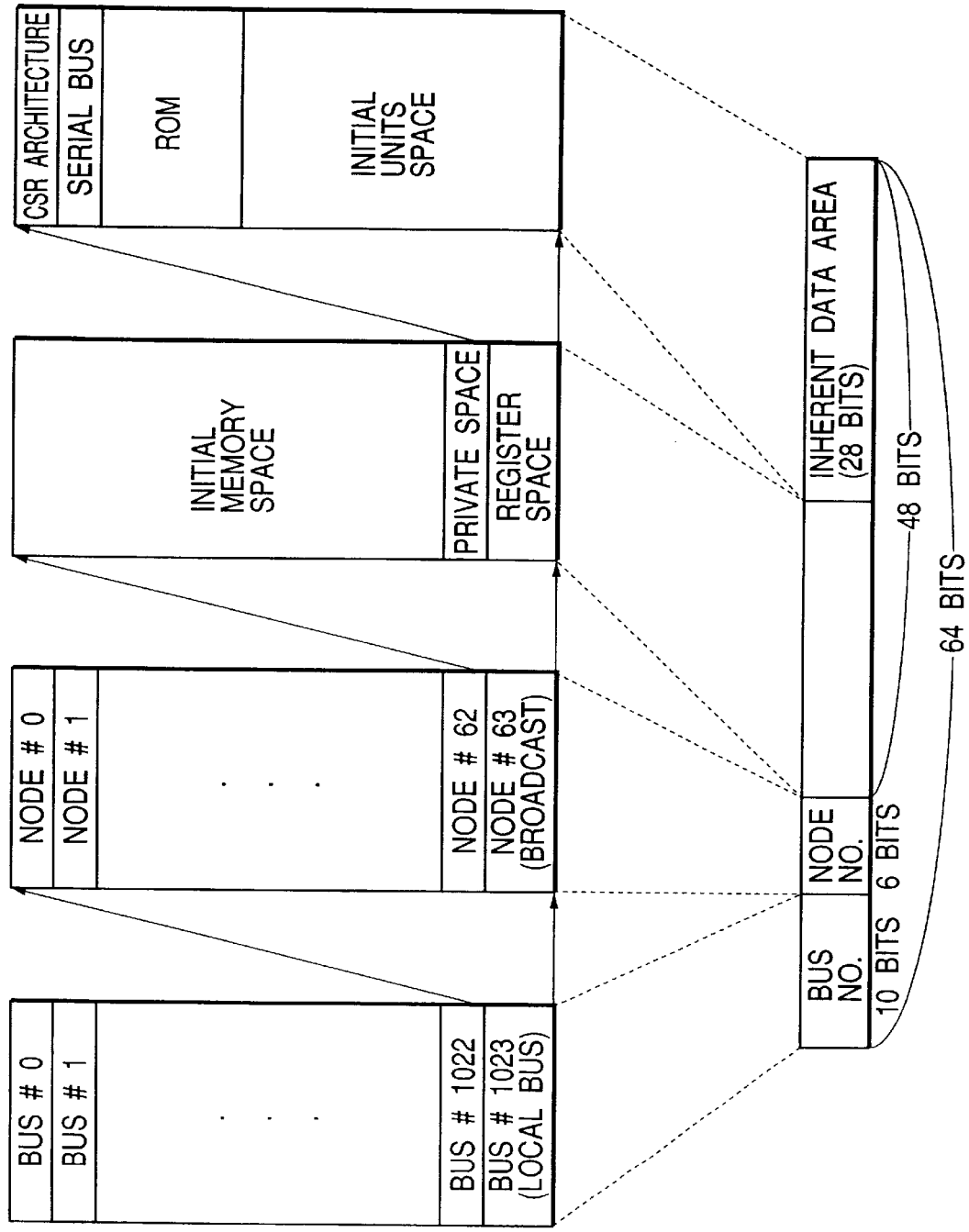
FIG. 3 is a diagram showing an address space for the 1394 serial bus.

FIG. 3 is a diagram showing an address space for the 1394 serial bus. A 64-bit address is allocated to each of the apparatuses (nodes) connected to the 1394 serial bus, and is inherent to each apparatus. When this address is stored in a ROM, a node address for a local apparatus or a communication destination apparatus can be readily identified, and communication with a designated destination can also be performed.

The addressing for the 1394 serial bus is performed in accordance with a method that conforms to the IEEE 1212 standards. When setting up an address, the first ten bits are used to designate a bus number, and the following six bits are used to designate a node ID number. The remaining four bits are used as an address width that is provided for each of the apparatuses, and can be used as an inherent address space. The last 28 bits are used as an inherent data string in which is stored predetermined information concerning the identification of the apparatuses and their conditions of use.

The summary of the technique for the 1394 serial bus has been explained.

The technique that can be considered the feature of the 1394 serial bus will now be explained in more detail.

Figure 4:
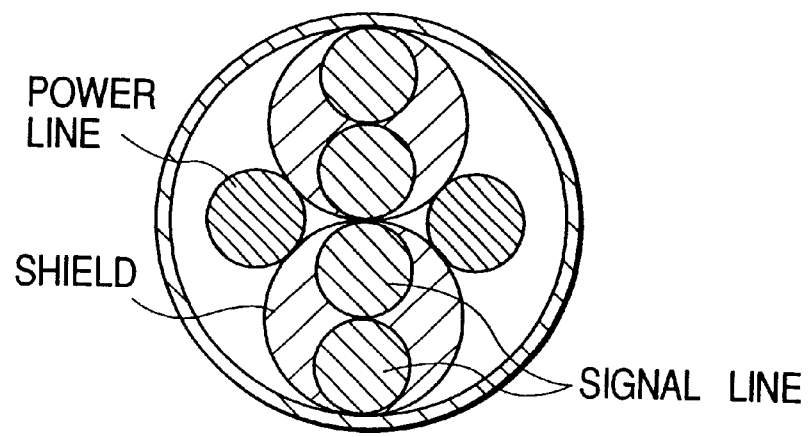
FIG. 4 is a cross-sectional view for explaining the electric specifications for the 1394 serial bus cable.

FIG. 4 is a cross-sectional view for explaining the electrical specifications for a 1394 serial bus cable.

As is shown in FIG. 4, a connection cable for the 1394 serial bus consists of six pins, i.e., two twisted pairs of shielded signal lines and two power lines. With this cable, power can be supplied to an apparatus that has no power source and to an apparatus whose voltage has been reduced due to a failure.

The voltage carried by the power lines is a specified 8 to 40 V, with the maximum specified current being a DC 1.5 A one. According to the standards established for the DV cable, the cable has four outlet pins, excluding the pins used for power.

Figure 5:
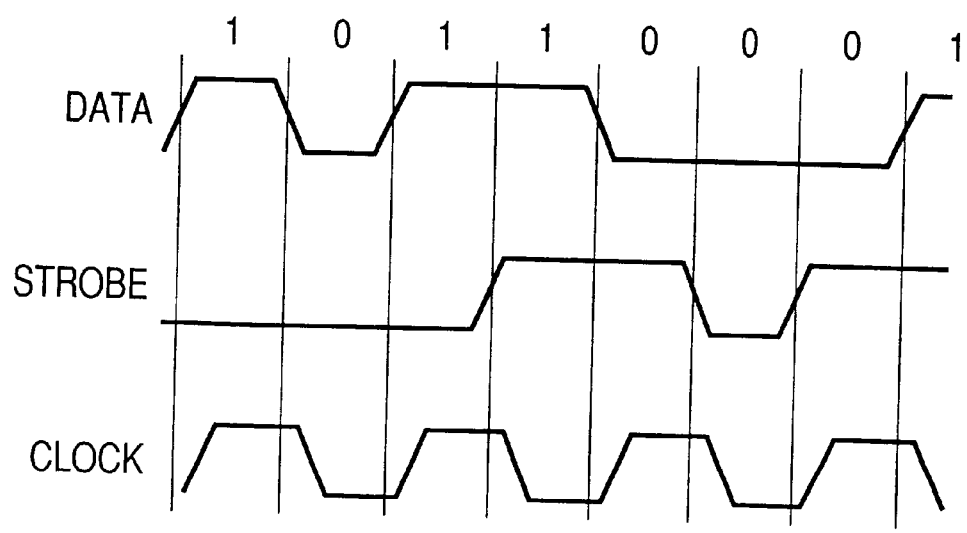
FIG. 5 is a diagram for explaining the DS-Link encoding system, which is a data transmission format used for the 1394 serial bus.

The DS (Data/Strobe)-Link encoding system will now be explained. FIG. 5 is a diagram for explaining the DS-Link encoding system that constitutes a data transmission format adopted for the 1394 serial bus.

The DS-Link encoding system is appropriate for fast serial data communication, and for its structure requires two twisted pair signal lines. Main data are transmitted along one of the twisted pair signal lines, and a strobe signal is transmitted along the other line. The reception side exclusive-ORs the data and the strobe signal that are received to reproduce a clock.

The merits provided by the DS-Link encoding system are: the transmission efficiency attained is higher than is that for an 8/10 B conversion; the circuit scale for a controller LSI can be reduced because a PLL circuit is not required; and since when there is no data to be transmitted information that indicates the existence of an idle state need not be transmitted, the transceiver for each apparatus can be set to the sleep state, and the consumption of power can be reduced.

The operating sequence for the resetting of a bus will now be described.

A node ID is provided for each of the apparatuses (nodes) that are connected to the 1394 serial bus in order to identify these apparatuses as the members of a network configuration.

When a network configuration is altered, for example, when the number of nodes is changed due to the insertion/removal of a node or due to a power ON/OFF state, and a new network must be identified, the nodes that have detected the change transmit bus reset signals via the bus, and then a mode is established for the identification of a new network configuration.

To detect the change, the nodes detect a change in the bias voltage on the 1394 substrate. Specifically, a node, upon receiving a bus reset signal from a specific node, performs the processing for the transmission to the link layer of the occurrence of a bus reset event and repeats the transmission of a bus reset signal to another node. When the bus reset signal has been detected by all the nodes, a bus reset process is begun.

The bus reset process can be initiated by the connection/disconnection of a cable and by the hardware detection, for example, of an abnormality in a network, or by a command in accordance with the protocol being issued directly to the physical layer through the host SUP control.

When the bus reset process is initiated, the transmission of data is temporarily halted and suspended. When the bus reset has been completed, the transmission of data is resumed across a new network.

Figure 6:
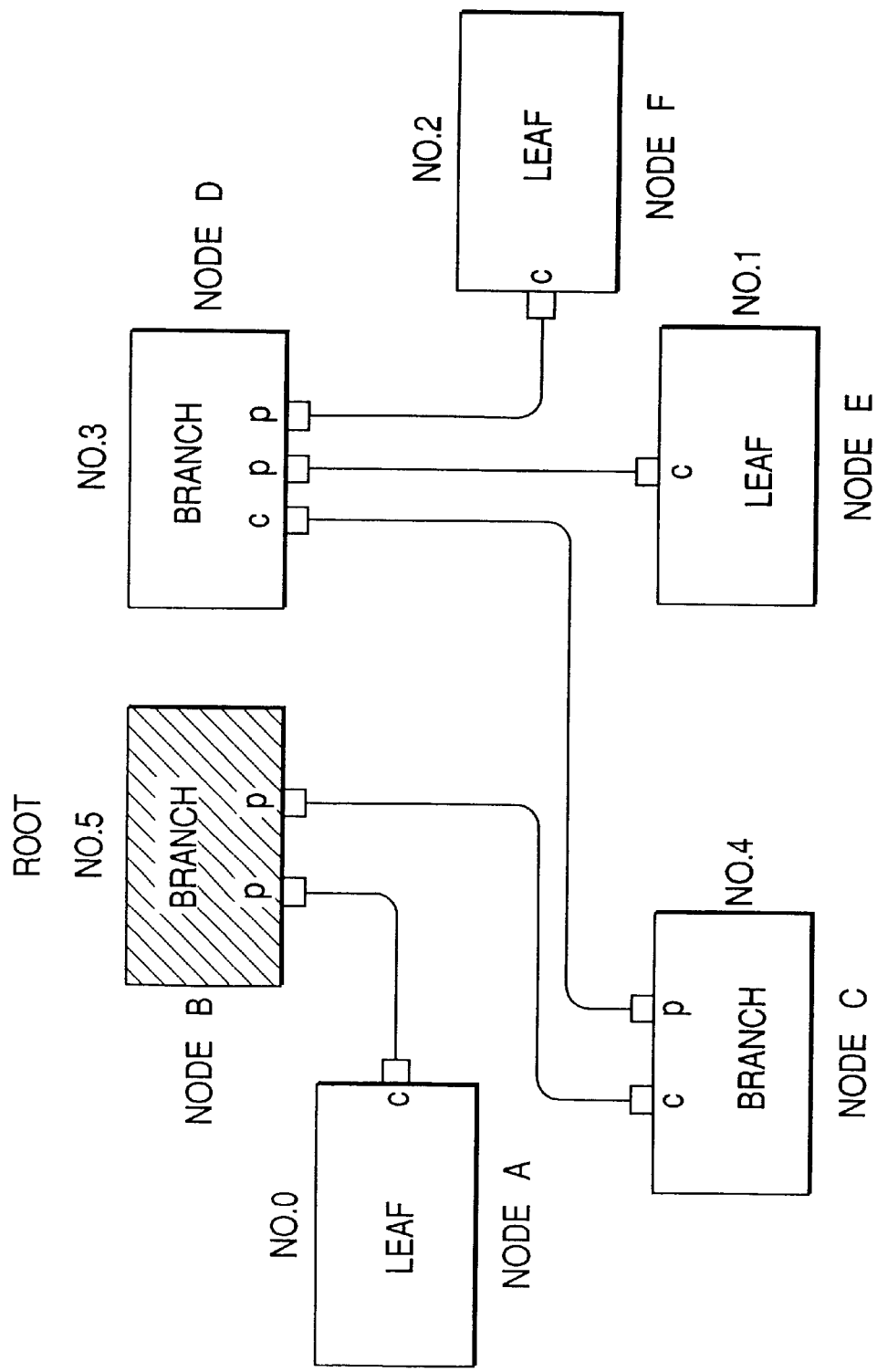
FIG. 6 is a specific explanatory diagram showing the node ID determination processing performed in an actual network.

FIG. 6 is a specific explanatory diagram showing the node ID determination processing for an actual network.

In this hierarchical structure, node A and node C are connected directly below node B (root), node D is connected directly below node C, and node E and node F are connected directly below node D. Ports to which the symbol "c" has been added correspond to "child" nodes, and ports to which the symbol "p" has been added correspond to "parent" nodes. A node connected to two or more ports is called a "branch", and a node connected to only one port is called a "leaf".

In FIG. 6, when the bus is reset, in order to identify the connection states for the individual nodes, a parent-child relationship is declared between the ports of the nodes that are directly connected. By "parent-child relationship" is meant the upper and the lower relationship in a hierarchical structure. The parent is in the upper rank in the hierarchical structure, while the child is in the lower rank.

Assume that node A first declared a parent-child relationship after the bus was reset. Specifically, basically, nodes having only one port connection (leaves) can first declare a parent-child relationship. This is because these nodes (leaves) can be the first to recognize that they have only one port connection. Accordingly, the leaves can understand that they are located at the ends of the network, and the parent-child relationship is determined beginning with the first node among them that initiates the operation. The port of a node that has declared a parent-child relationship (e.g., node A of nodes A and B) is determined to be a "child", and the port of the other node is determined to be a "parent". In this manner, the parent-child relationship "child-parent" is determined for nodes A and B, nodes E and D, and nodes F and D.

At one higher rank, the upper parent-child relationship is declared sequentially for the nodes (branches) that have a plurality of connections, beginning with a node that receives from another node the declaration of the parent-child relationship. That is, when the parent-child relationships for nodes D and E and for nodes D and F are determined, the parent-child relationship for node D to node C is declared. As a result, the relationship of nodes D and C is determined to be "child-parent".

Upon receiving the declaration of the parent-child relationship from node D, node C declares a parent-child relationship with node B, which is connected to the other port of node C. As a result, the parent-child relationship between nodes C and B is determined to be "child-parent".

In this manner, the hierarchical structure in FIG. 6 is constructed, until finally node B, which is the parent for all the rest of the linked nodes, is determined to be the root node. Only one root node exists in one network configuration.

In the example in FIG. 6, node B is determined to be the root node. However, if, upon receiving the declaration of the parent-child relationship from node A, node B declares the parent-child relationship to the other nodes earlier, another node may be selected to serve as the root node. That is, any node can be the root node, depending on the transmission timing, and the root node is not always a constant in the same network configuration.

When the root node is determined, the mode for determining the individual node IDs is initiated. In this mode, each node transmits to the remaining nodes its individual node ID that has been determined (broadcast function).

In the ID information provided for a node is included the node ID number for the node, information concerning the connection position, and the number of ports available at the node and information concerning the parent-child relationship at each of the ports.

The node ID numbers are allocated first to those nodes (leaves) that have only one port connection. In this instance the node numbers 0, 1, . . . are allocated sequentially.

The node for which a node ID number has been determined broadcasts information that includes the node ID number to the other nodes. As a result, the node ID number is understood as having been "allocated".

When all the leaves have obtained their node ID numbers, the node ID numbers that follow the ID numbers assigned to the leaves are allocated for the branches. That is, as well as the leaves, branches for which node ID numbers have been allocated broadcast ID information that includes node ID numbers, until finally the root node broadcasts its own ID information. Therefore, the largest ID number is always assigned to the root.

When the node ID numbers for the entire hierarchical structure have been allocated, reconstruction of the network has been completed, and no further bus initialization is required.

The arbitration process will now be explained.

For the 1394 serial bus, the arbitration performed for the right of use of a bus is always completed before data is transmitted. The 1394 serial bus network is a logical bus network wherein the separately connected apparatuses relay received signals to all the other apparatuses in the network. Therefore, the arbitration process is necessary in order to prevent packet conflicts. As a result, at a specific time only one node can transmit a packet.

Figure 7B:
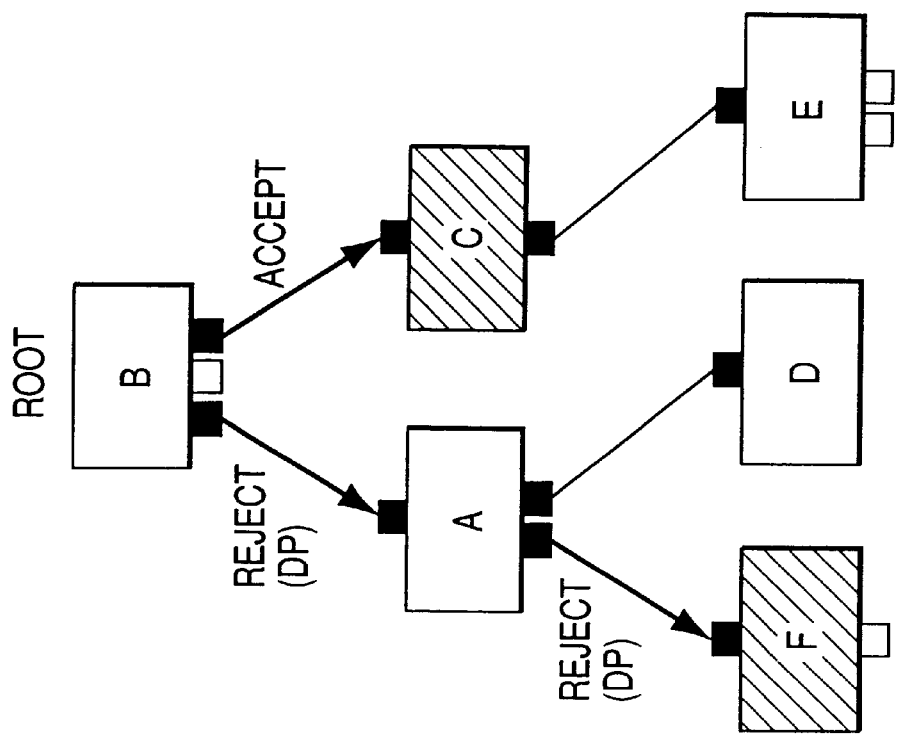
FIGS. 7A and 7B are diagrams for explaining arbitration.
Figure 7A:
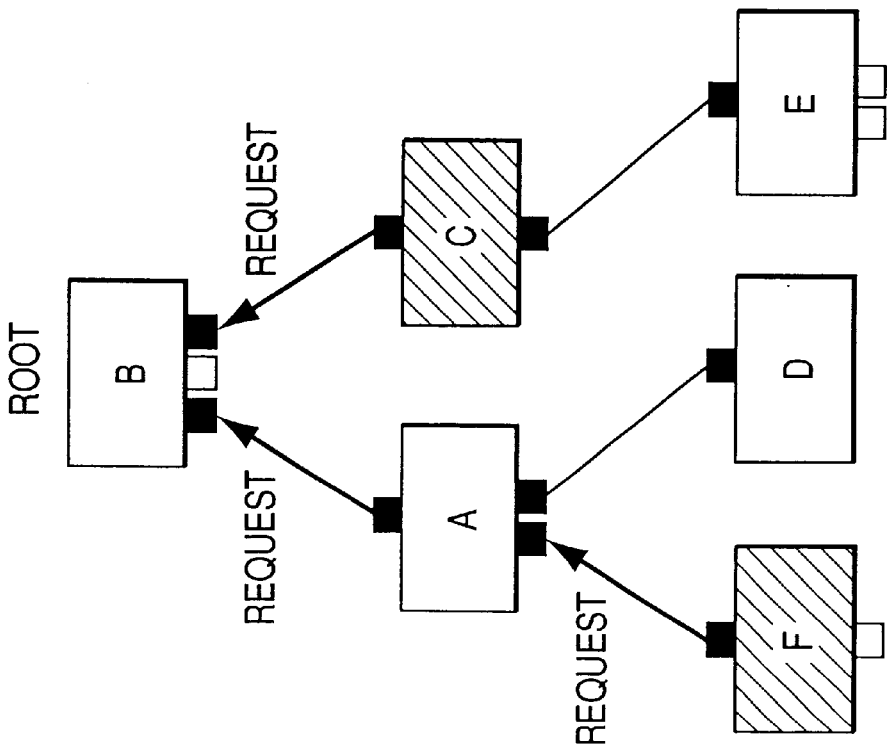

FIGS. 7A and 7B are diagrams for explaining the arbitration process. In FIG. 7A is shown the arbitration performed when the right of use of a bus is requested, and in FIG. 7B is shown the arbitration performed when the right of use of a bus is permitted.

When the arbitration is initiated, one or more nodes issue to their parents a request for the right of use of a bus. In FIG. 7A, node C and node F are the nodes that issue requests for the right of use of the bus. Upon receiving the requests, the parent node (node A in FIGS. 7A and 7B) issues (relays) to its parent node (node B in FIGS. 7A and 7B) a request for the right of use of the bus. This request is finally transmitted to the root node that performs the arbitration.

Upon receiving the requests for the right to use the bus, the root node determines which nodes are to be permitted to use the bus. This arbitration is performed only by the root node, and the use of the bus is granted only to a node for which the right of use has been determined through arbitration. For example, in FIG. 7B, the request by node C is accepted, while the request by node F is denied.

The root node transmits a DP (Data Prefix) packet to a node that was not selected during the arbitration process, and notifies the node that the request was denied. The request for the right to use the bus, which was issued by the node whose request was denied, is suspended and held until the next arbitration process is performed.

The node that as the result of the arbitration is granted permission to use the bus can thereafter initiate the transmission of data.

An explanation will now be given for an asynchronous transmission.

Figure 8:
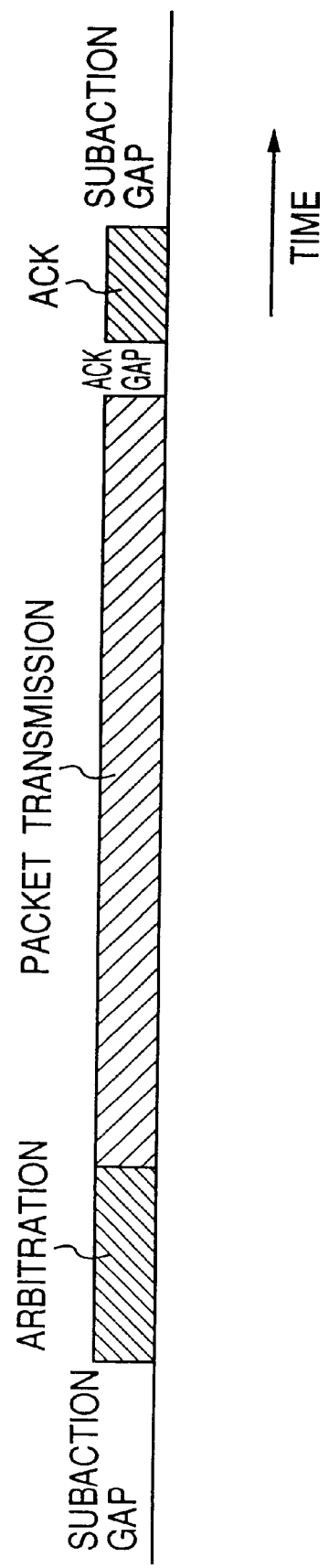
FIG. 8 is a diagram showing the time-transient shift state for asynchronous transmission.

FIG. 8 is a diagram showing the time-transient shift state that exists during an asynchronous transmission.

In FIG. 8, the first subaction gap indicates that the bus has entered an idle state. When the idle time has become a constant, a node that desires to perform a transmission determines that the bus can be used, and initiates the arbitration required to obtain the right to use the bus.

When as a result of arbitration a node obtains the right to use a bus, that node transmits data in the form of packets. Whereafter, following the elapse of a short ACK period, a node that receives the data returns a code (ACK) to acknowledge receipt of the data, or returns a response packet. In this manner, the transmission of data is completed.

The ACK code consists of a four-bit information nibble plus a four-bit checksum nibble, and includes information indicating whether the transmission of data has been successful, or whether the operating state is the busy state or the pending state. The ACK code is immediately returned to the transmission source node.

Figure 9:
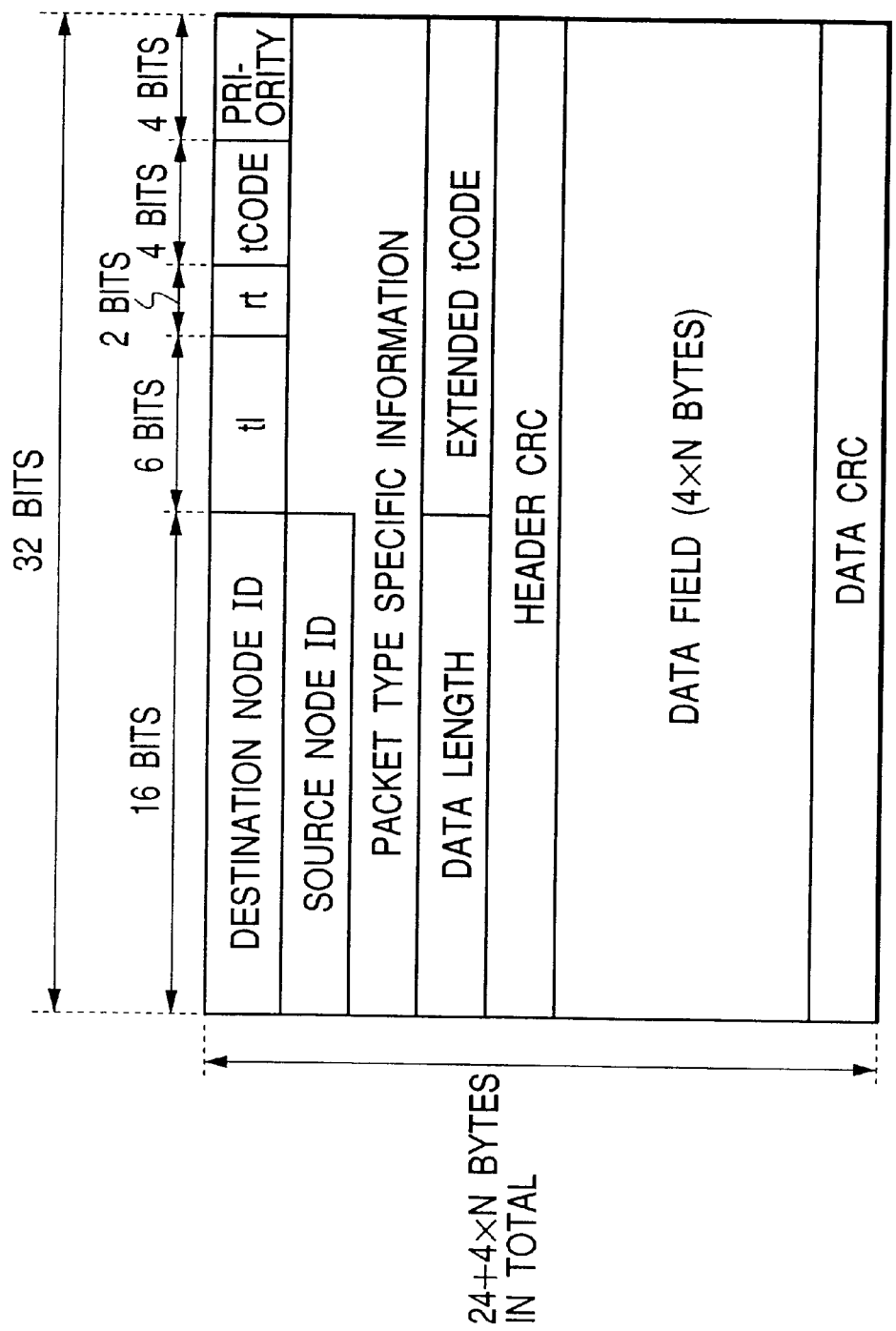
FIG. 9 is a diagram for explaining a packet format for asynchronous transmission.

FIG. 9 is an explanatory diagram showing an example packet format for asynchronous transmission.

The packet consists of a data portion, error correction CRC data, and a header portion. As is shown in FIG. 9, a destination node ID, a source node ID, the length of the data to be transmitted, and various other codes are written in the header portion.

An asynchronous transmission is a one-to-one communication between a specific node and another node. And a packet is broadcast by a transmission source node to the remaining nodes in the network. However, since each node ignores all packets other than those that are addressed to it, only the destination node reads the packet.

An explanation will now be given for the isochronous transmission process.

The isochronous transmission process, which is the most important feature of the 1394 serial bus, is a transmission mode that is appropriate for the transmission of data such as multimedia data, to include video data and audio data, for which real-time transmission is required.

While the asynchronous transmission is a one-to-one transmission, the isochronous transmission is a broadcasting transmission mode during which a transmission source node uniformly transmits data to all other nodes.

Figure 10:
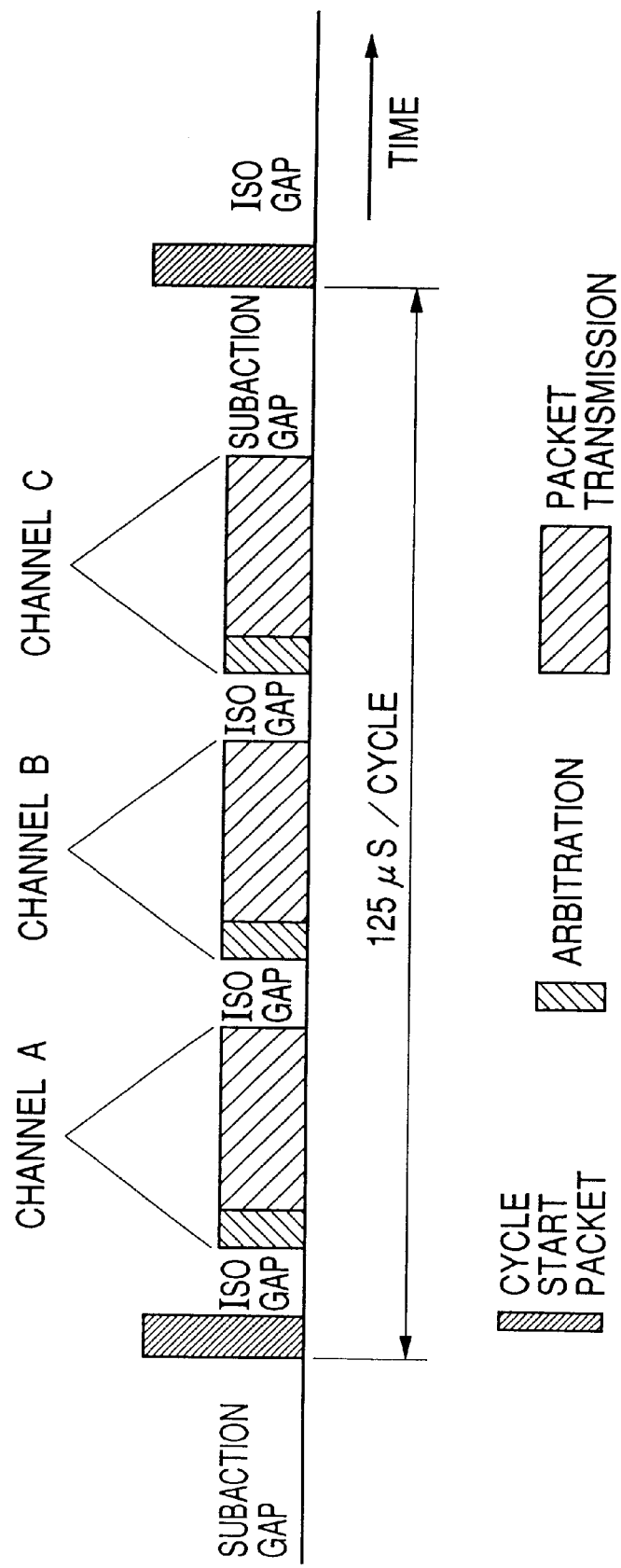
FIG. 10 is a diagram showing the time-transient shift state for isochronous transmission.

FIG. 10 is a diagram showing a time-transient shift state for an isochronous transmission.

Isochronous transmissions are performed along the bus at constant intervals. One of these intervals is called an isochronous cycle, which is 125 microseconds in length. Included in a cycle start packet is the start time for the cycle, which is used to adjust the timing for an individual node. A node called a cycle master transmits a cycle start packet that indicates the start of a current cycle that occurs after the transmission of data at the preceding cycle is completed and after a predetermined idle time (a subaction gap) has elapsed. In other words, the time interval at which cycle start packets are transmitted is 125 microseconds.

Since channel IDs, such as channel A, channel B and Channel C shown in FIG. 10, are provided for a plurality of packets during one cycle, the packets can be identified as they are being transmitted. Therefore, packets can be transmitted among a plurality of nodes in real time, and a destination node can fetch only data having a desired channel ID. The channel ID does not represent the address of a transmission destination, and merely provides a logical number for the data. Therefore, a specific packet can be broadcast by one transmission source node to all the other nodes.

The arbitration process is performed before the isochronous transmission of packets is begun, as well as before the asynchronous transmission is begun. However, since unlike the asynchronous transmission the isochronous transmission is not a one-to-one communication, no ACK exists.

An isochronous gap (Iso Gap) in FIG. 10 represents the idle time that is required to ascertain, before an isochronous transmission, that a bus is not in use. When a predetermined idle time has elapsed, the node that is to perform an isochronous transmission determines whether the bus is in use, and performs an arbitration process before beginning the transmission.

Figure 11:
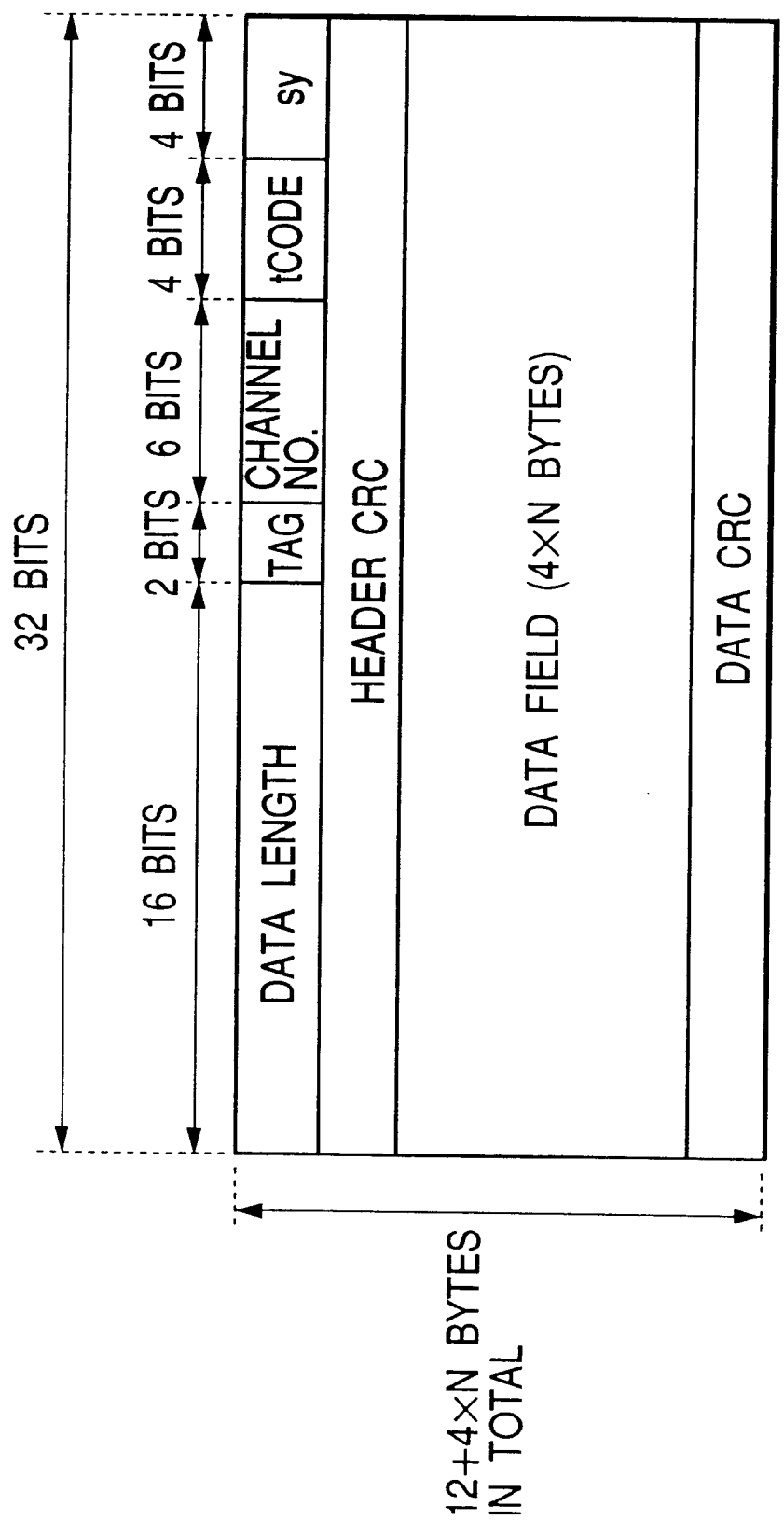
FIG. 11 is a diagram for explaining a packet format for isochronous transmission.

FIG. 11 is a diagram for explaining an example packet format for an isochronous transmission.

Each of the packets selected for the channels consists of a data portion, an error correction data CRC, and a header portion. As is shown in FIG. 11, the length of data to be transmitted, a channel ID, various codes, and an error correction CRC header are written in the header portion.

The bus cycle will now be described.

Figure 12:
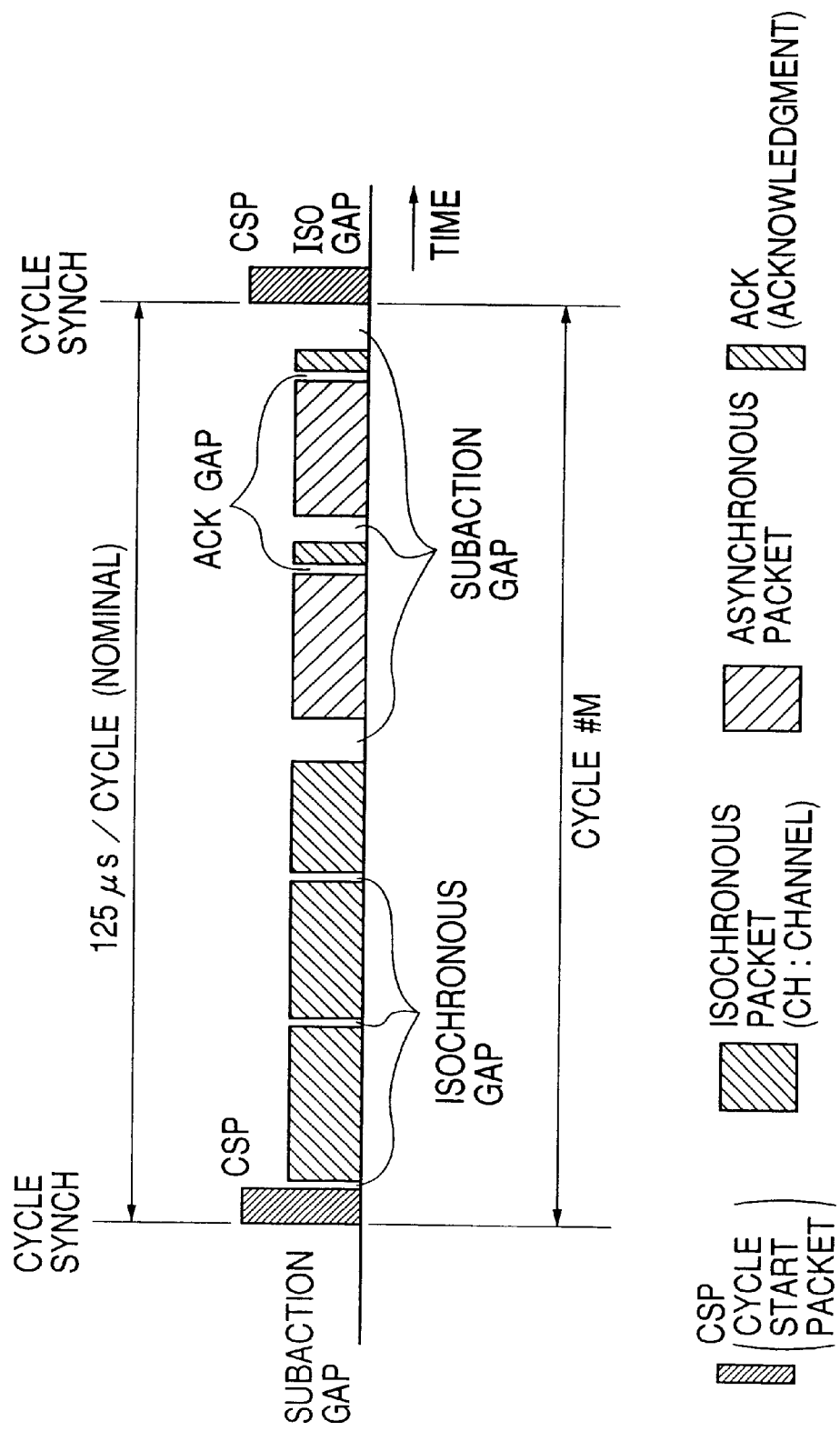
FIG. 12 is a diagram showing the time-transient transmission state into which the bus enters placed when both an isochronous transmission and an asynchronous transmission are present.

Actually, an isochronous transmission and an asynchronous transmission can coexist on the 1394 serial bus during a transmission. FIG. 12 is a diagram showing the time-transient shift state for the bus when the isochronous transmission and the asynchronous transmission coexist.

The isochronous transmission is performed before the asynchronous transmission. This is done because, for the transmission following the start of the cycle start packet, the gap length (isochronous gap) required to initiate the isochronous transmission is shorter than is the gap length (subaction gap) for the idle time that is required to initiate the asynchronous transmission. Therefore, the isochronous transmission is performed before the asynchronous transmission.

During the m-th cycle (cycle #m), as is shown in FIG. 12, the cycle start packet is transmitted by the cycle master to the individual nodes. The nodes then adjust the time, and when a predetermined idle time (isochronous gap) has elapsed, a node that should perform an isochronous transmission performs the arbitration and initiates the transmission of packets. In FIG. 12, isochronous packets for channels e, s and k are transmitted.

When the processing extending from the time the arbitration is performed until the packets are transmitted has been repeated the number of times that is equivalent to the number of channels, and the isochronous transmission performed for the m-th cycle (cycle #m) has been completed, the asynchronous transmission can be begun. When the idle time has reached the subaction gap at which the asynchronous transmission is enabled, the node that is to perform the asynchronous transmission determines that it can start the arbitration.

It should be noted, however, that the period during which the asynchronous transmission is enabled is limited only to a period beginning upon the termination of the isochronous transmission and continuing until the next cycle start packet (Cycle Synch) is transmitted, a time during which the subaction gap for the initiation of the asynchronous transmission is obtained.

At the m-th cycle (cycle #m) in FIG. 12, first, the isochronous packets for three channels are transmitted, and then two asynchronous packets (packet 1 and packet 2) (including ACKs) are transmitted. Since following the asynchronous packet 2 the time (Cycle Synch) is reached at which the (m+1)th cycle (cycle #m+1) should be started, the transmission at the m-th cycle (cycle #m) is terminated.

If the time (Cycle Synch) at which the next cycle start packet should be transmitted is reached during an asynchronous or an isochronous transmission, the operation is not forcibly halted and the end of the idle time following the pertinent transmission is waited for before the transmission of the next cycle start packet is begun. That is, when one cycle is continued for 125 microseconds or longer, the next cycle is shorter than the standard 125 microseconds by a time that is equivalent to that of the delay. In other words, the isochronous cycle can be extended or shortened while using 125 microseconds as a reference time.

It should be noted, however, that as necessary the isochronous transmission is performed continuously during each cycle in order to provide a real-time transmission, and that the asynchronous transmission may be delayed until the following cycle due to a reduction in the cycle time.

Such delay information is also managed by the cycle master.

Figure 13:
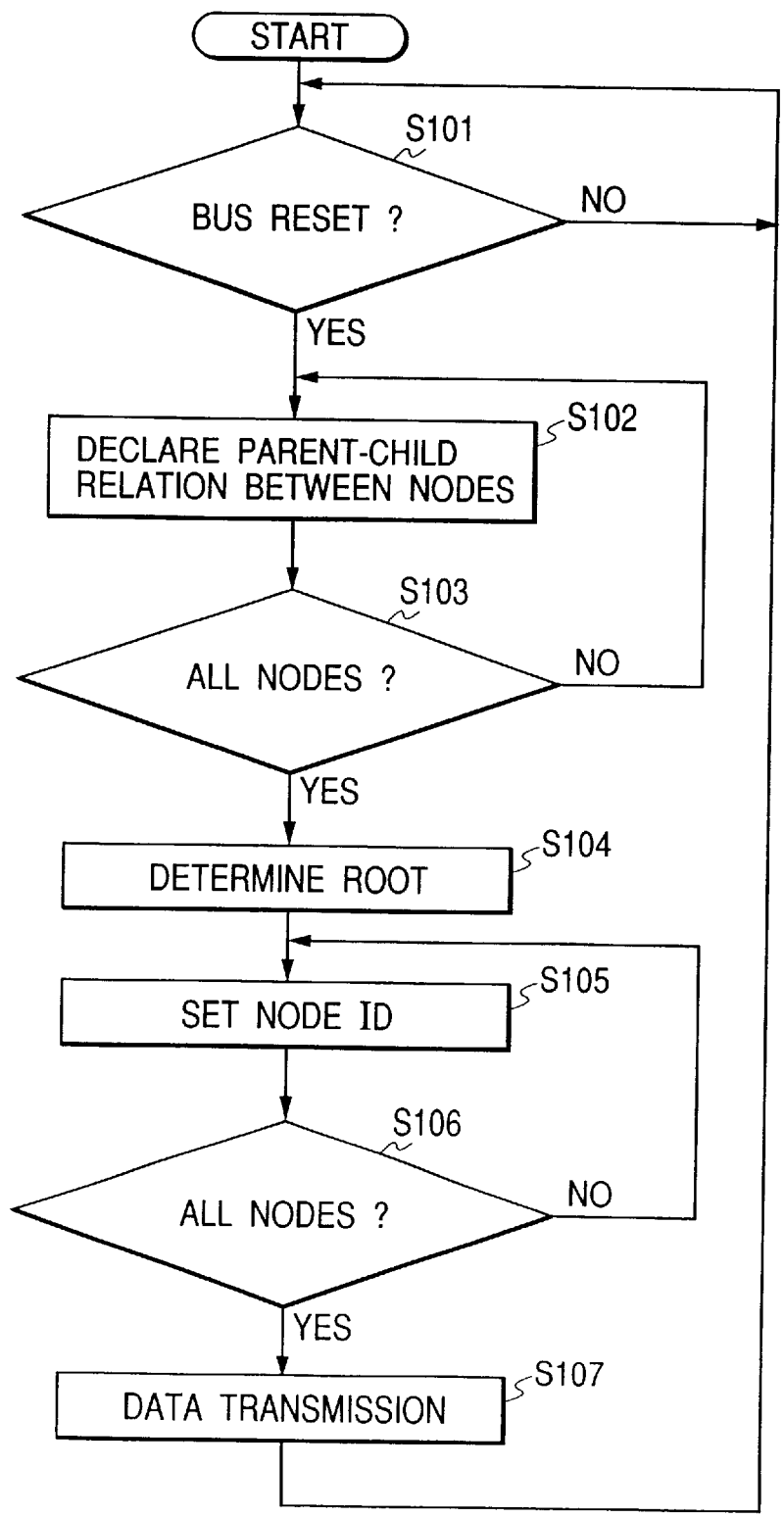
FIG. 13 is a flowchart showing the bus operation sequence extending from the time the bus is reset until the node ID has been determined that enables data transmission.

The above described node ID determination processing will now be described. After the bus is reset, the operation for providing node ID numbers for the individual nodes is begun so that the nodes can construct a new network configuration. FIG. 13 is a flowchart for a bus processing series extending from the time the bus is reset until the node ID number is determined and data transmission is initiated.

The resetting of the bus in the network is monitored constantly, and whether or not a bus reset has occurred is determined in accordance with the ON/OFF state of the power of the node (step S101). This determination process is repeated until a bus reset occurs. When at step S101 a bus reset has occurred, the parent-child relationship is declared for the nodes that are connected directly in order to obtain a new connection state for the network that has now been reset (step S102). A check is then performed to determine whether the parent-child relationship has been declared for all the nodes (step S103), and when the parent-child relationship has not been declared for all the nodes, the processes at steps S102 and S103 are repeated.

When, at step S103, the parent-child relationship has been declared for all the nodes, one root is determined (step S104). Then, the setup is performed to provide node ID numbers for the individual nodes (step S105).

A check is performed to determine whether the node ID numbers have been set for all the nodes (step S106). When the node ID numbers have not been set for all the nodes, the process at step S105 is repeated until node ID numbers are provided for all the nodes in the above described node order. When, at step S106, the node ID numbers have been set for all the nodes, it is assumed that a new network configuration has been identified by all the nodes. Thus, the exchange of data among the nodes is enabled (step S107), and the transmission of data is initiated.

In the state at step S107, the mode for monitoring the occurrence of a bus reset is again entered, and when a reset of the bus has occurred, the processing beginning at step S101 is repeated.

Figure 14:
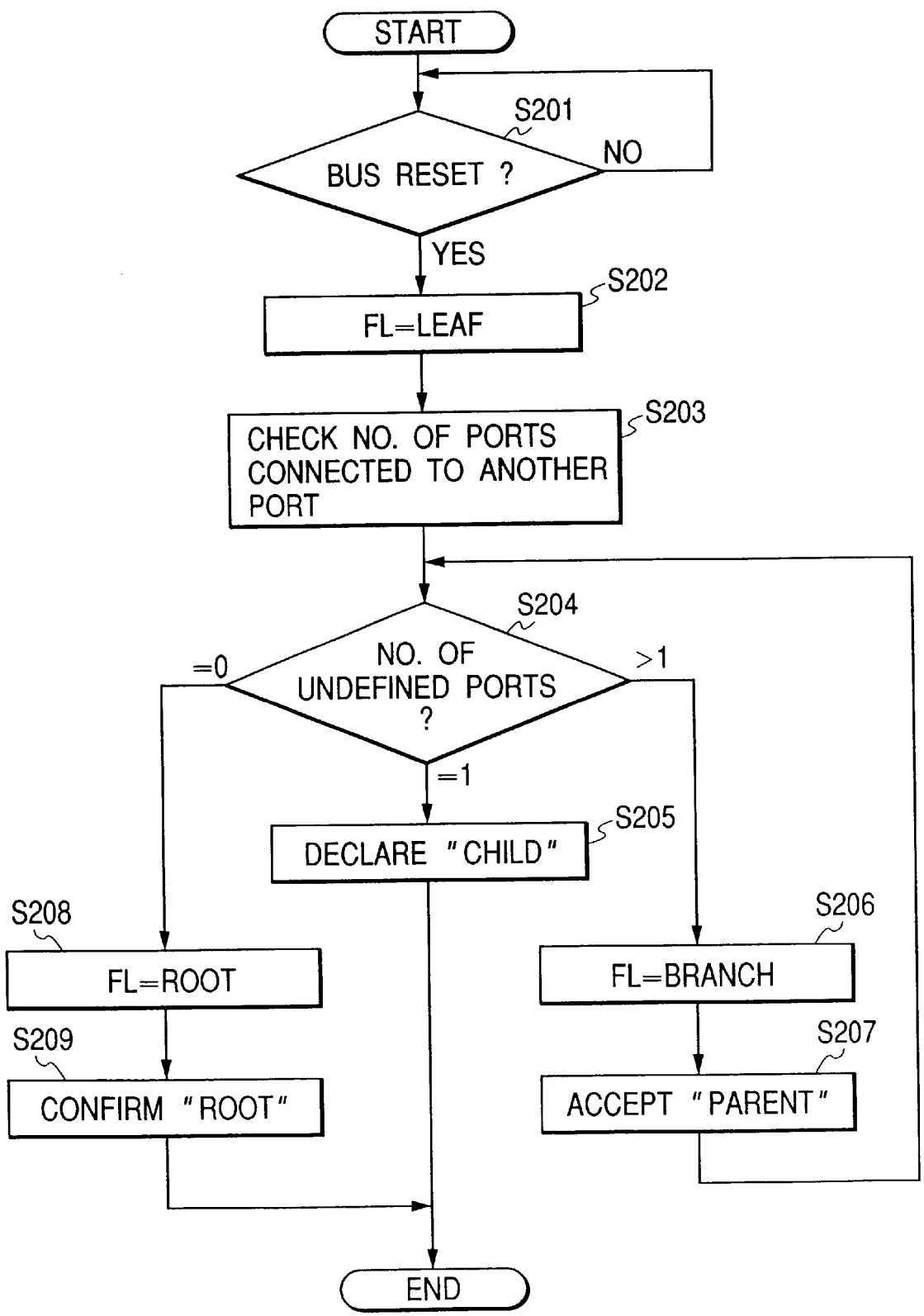
FIG. 14 is a detailed flowchart showing the processing performed in FIG. 13 extending from the time the reset of the bus is detected (step S101) until the determination of the root has been completed (step S104)

FIG. 14 is a detailed flowchart showing the processing in FIG. 13 extending from the time the bus reset is detected (step S101) until the root is determined (step S104).

First, a check is performed to determine whether a bus reset has occurred (step S201). When a bus reset has not occurred, the operating state is set to the standby state until a bus reset does occur. But when, at step S201, it is found that a bus reset has occurred, the network configuration is temporarily reset.

Then, a flag indicating a leaf (node) is set for each of the apparatuses as the first stage of a job for again obtaining the connection state for the network that has been reset (step S202). Following this, all of the ports of the apparatuses are examined to determine how many of the ports are connected to other nodes (step S203).

The number of undefined ports (those for which the parent-child relationship has not yet been determined) is examined in order to begin to declare the parent-child relationship (step S204). It should be noted that immediately after the bus is reset the number of ports and the number of undefined ports correspond, and that as parent-child relationships are determined, the number of the undefined ports detected at step S204 is accordingly reduced.

Immediately after the bus is reset, only a leaf can declare a parent-child relationship, and whether a pertinent node is a leaf can be determined in accordance with the number of ports found at step S203. That is, if the pertinent node is a leaf, the initial number of undefined ports it has is "1". Therefore, at step S205, the node makes a parent-child relationship declaration, relative to a connected node, to the effect that, "I am a child and my connected node is a parent". The operation is thereafter terminated.

When, at step S203, the number of ports at a specific node is determined to be greater than one the node realizes that it is a branch. And when at step S204, immediately after the bus is reset, the number of undefined ports at the node is determined to be greater than one, a flag FL is set that indicates the node is a branch (step S206). Then, as a branch, the node accepts the parent-child relationship of "parent" declared by the leaf that is connected to it (step S207).

After the leaf has declared the parent-child relationship and at step S207 the branch has accepted it, at step S204 the number of undefined ports at the branch is determined, and when the number of undefined ports is "1", the branch can issue a declaration to the effect that it is a child of a node that is connected to its remaining port.

If, at step S204 during the second cycle, the number of undefined ports at the specific branch is two or more, at step S207 the branch accepts the designation of "parent" issued by the leaf or by another branch at the time it confirms the relationship.

Finally, when at one of the branches the number of undefined ports is 0, or, exceptionally, at a leaf (because even though it was possible, the node did not quickly declare itself to be a child), it is assumed that the declaration of the parent-child relationships for the entire network has been completed. Then, a root flag is set only for that node that has no undefined ports (a node for which all the ports have been determined to be parent ports) (step S208), and the root is confirmed (step S209).

Figure 15:
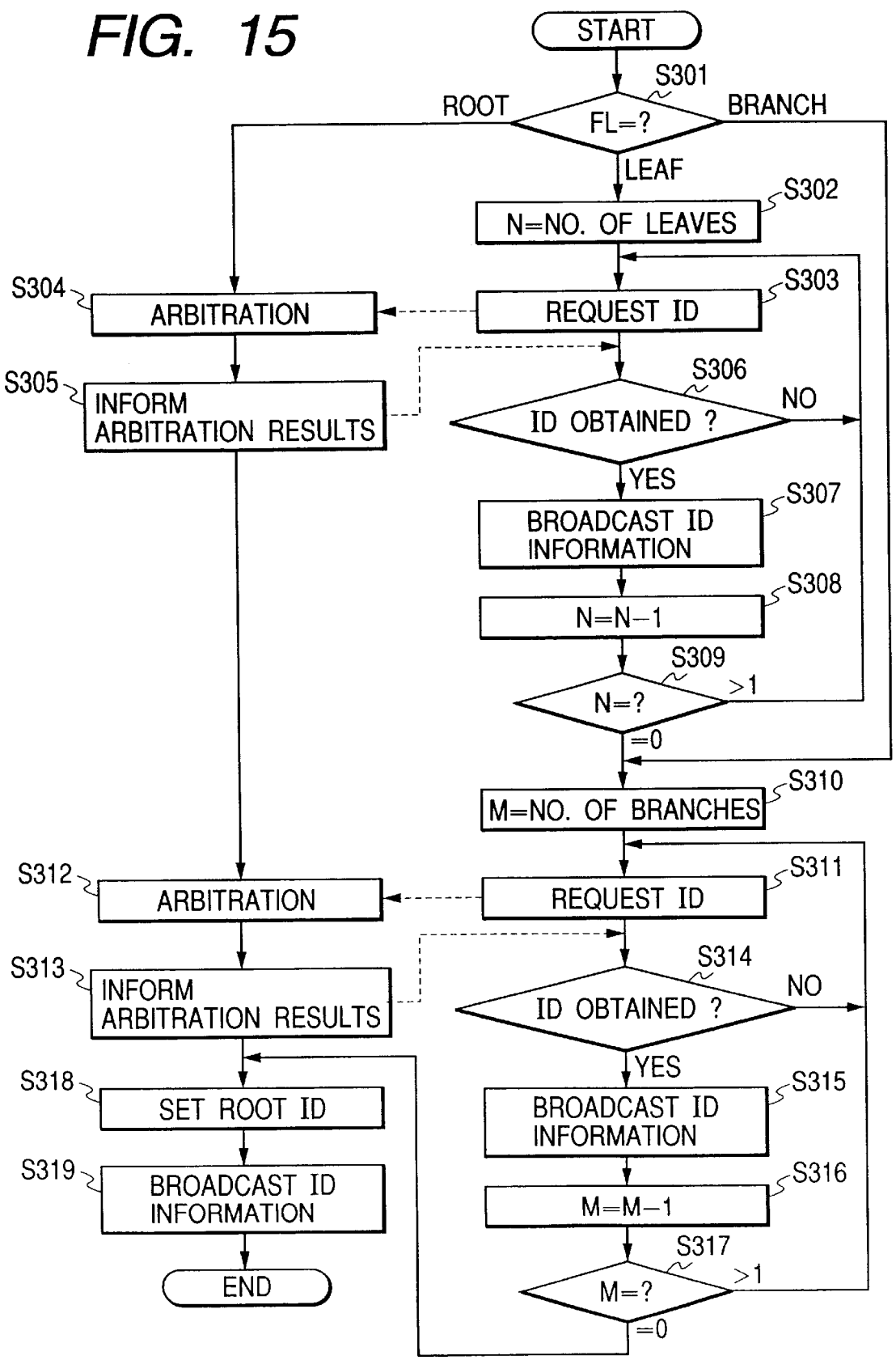
FIG. 15 is a detailed flowchart showing the processing in FIG. 13 extending from the time the determination of the root is made (step S104) until the determination of the node ID has been made (step S106)

FIG. 15 is a detailed flowchart showing the processing in FIG. 13 extending from the determination of the root (step S104) to the determination of the node ID number (step S106).

Since the flag information for the leaves, the branches and the root node is set during the processing in FIG. 14, the nodes are sorted in accordance with the flags (step S301).

The setup for the node ID numbers is begun with the leaves, ID numbers being provided, in the named order, for the leaves, the branches and the root, beginning with the node that has the smallest node number (node number=0 . . . ).

When the node type is a leaf, the number of leaves that are present in the network is set to N (N is a natural number) (step S302). Then, requests that node ID numbers be provided are issued by the individual leaves to the root (step S303).

When a plurality of such requests are issued, the root performs an arbitration process (step S304). Thereafter, a node ID number is provided for the one node that is accepted as a result of arbitration, and notifications that their requests were denied are transmitted to the remaining nodes (step S305).

After issuing a request for a node ID number, a leaf determines whether the node ID number has been obtained (step S306). Then, at step S303 a node that has failed to acquire a node ID number again issues an ID number request, while the leaf that has obtained a node ID number broadcasts its ID information to all the other nodes (step S307). When the ID information for a specific node has been broadcast, the number of leaves N is decremented by one (step S308).

Then, the remaining leaf number N is examined (step S309). And when the remaining number of leaves N is equal to or greater than one, the processing from step S303, whereat a node ID number is requested, to step S309 is repeated.

When the ID information for all the leaves has been broadcast, at step S309 it is determined that the number N=0, and the ID setup for the branches is initiated.

First, the number of branches M (M is a natural number) that are present in the network is set (step S310).

The branches then issue requests to the root to obtain node ID numbers. The root performs an arbitration process and provides the branch whose request is accepted the node ID number that immediately follows the node ID number assigned to the last leaf (step S312). Thereafter, ID information, or signals indicating their requests were not accepted are transmitted to the other branches that issued requests (step S313).

The branches that requested node ID numbers at step S311 then make an examination to determine whether they have obtained node ID numbers (step S314), and the branches that failed to acquire node ID numbers again issue requests for node ID numbers to the root at step S311.

When, at step S314, a specific branch obtains a node ID number, the branch broadcasts its ID information to all the other nodes (step S315). When the ID information for a specific node has been broadcast, the number of remaining branches M is decremented by one (step S316).

When the number of the remaining branches M is equal to or greater than one, the processing at steps S311 to S316 is repeated until all the branches have broadcast their ID information. When all the branches have obtained their ID information, at step S317, M=0 and the acquisition of node ID numbers for the branches is terminated. As a result, only the root has not as yet acquired a node ID number. Therefore, the root employs as its ID number the smallest node ID number that has not yet been assigned (step S318), and broadcasts this ID information (step S319).

By means of the above processing, after the parent-child relationships have been determined the node ID numbers are set for all the nodes.

Figure 16:
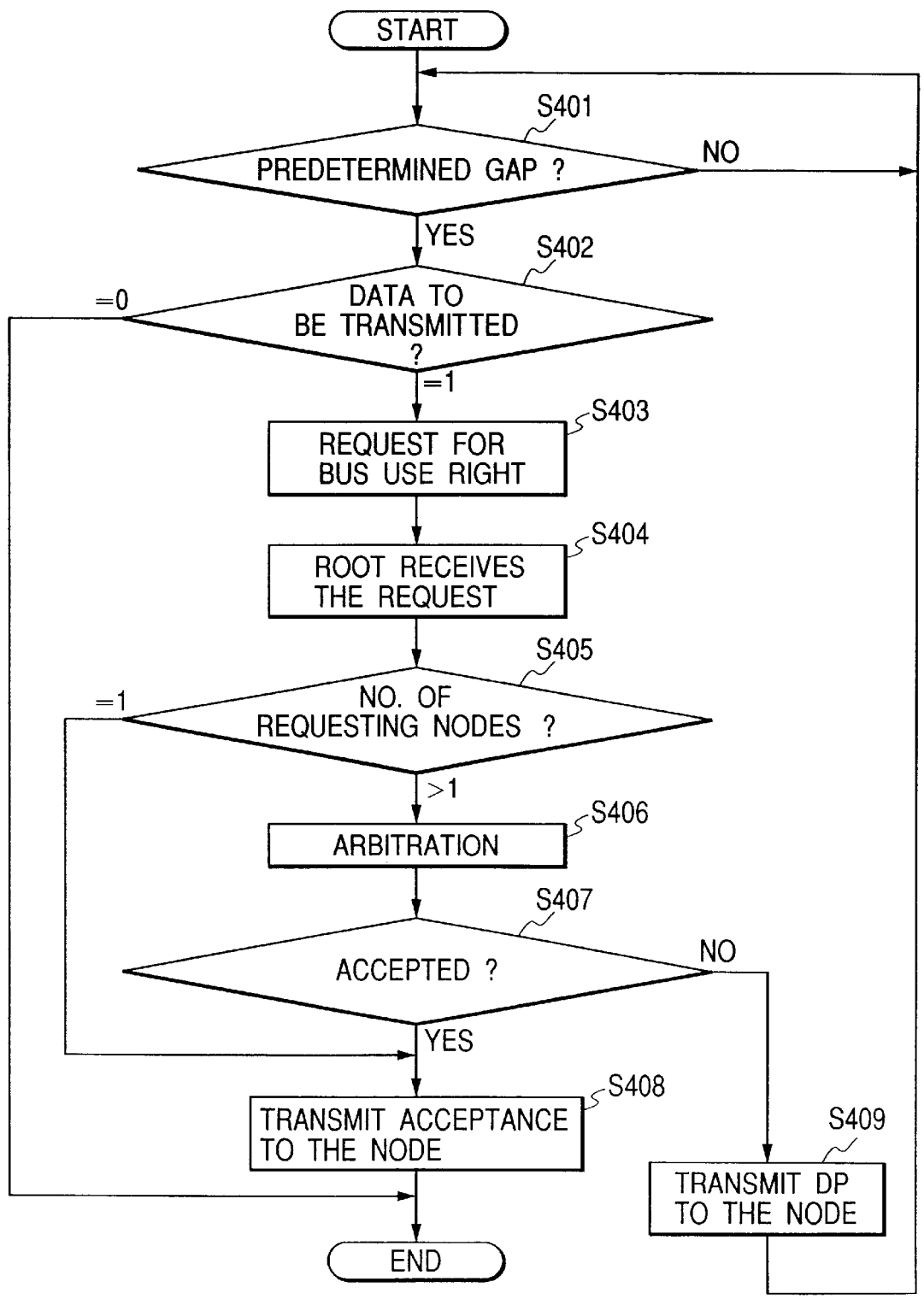
FIG. 16 is a flowchart showing the arbitration processing.

FIG. 16 is a flowchart showing the arbitration processing.

The bus must be in the idle state when a node initiates the transmission of data. When a predetermined idle time gap interval (e.g., a subaction gap) that is set for each transmission mode has elapsed, the node can ascertain that the preceding data transmission has been terminated and that the bus is currently not in use, and that it can begun to transmit data.

First, a check is performed to determine whether a predetermined gap interval has elapsed that corresponds to data that are to be transmitted, either asynchronous data or isochronous data (step S401). As long as the predetermined gap internal is not obtained, the right of use of the bus, which is required before transmission can begin, can not be requested. Therefore, the process at step S401 is repeated until the predetermined gap interval is obtained.

When, at step S401, the predetermined gap interval is obtained, a check is performed to determine whether there are data to be transmitted (step S402). When there are no such data, the processing is terminated.

When data to be transmitted are present, a request for the right of use of the bus is issued to the root (step S403). A signal that represents the request for the right of use of the bus is relayed via the apparatuses in the network in FIGS. 7A and 7B until it finally arrives at the root.

When the root receives one or more requests for the right of use of the bus (step S404), the root makes an examination to determine how many nodes issued requests (step S405). When, at step S405, it is found that a plurality of nodes issued requests, the root performs an arbitration process to determine which node should be provided the right of use (step S406). This arbitration is performed fairly; the same node is not granted permission all the time, and the right of use is awarded to all the nodes equally (fair arbitration). Through the arbitration, the root sorts out the node that can receive the right of use and the other nodes whose requests are denied (step S407). Since the result of the decision at step S407 for the node that obtains the right of use is affirmative (YES), a permission signal for the initiation of the transmission of data (packets) is transmitted by the root to the pertinent node (step S408). Since the result of the decision at step S407 for the nodes that can not obtain the right of use is negative (NO), a signal DP that indicates their requests were denied is transmitted to these nodes by the root (step S409).

When at step S405 the number of nodes is one, the right of use of the bus is given to that node, and the process at step S408 is performed. The processing is thereafter terminated.

An image processing apparatus that employs the thus featured 1394 serial bus will now be described.

Figure 17:
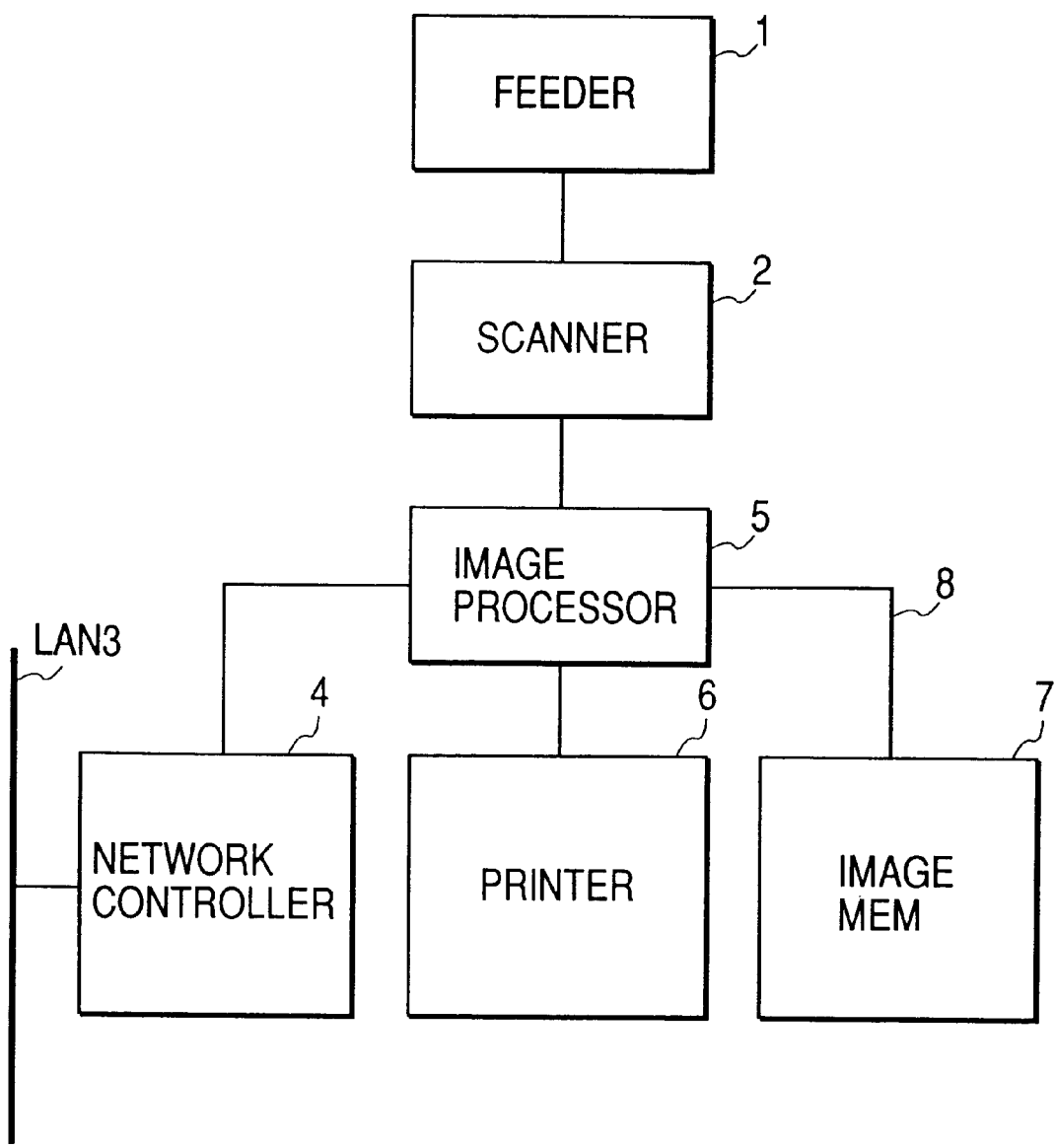
FIG. 17 is a block diagram showing the arrangement of a copier system that serves as an image processing apparatus according to the first embodiment of the present invention.

FIG. 17 is a block diagram illustrating the arrangement of a copier system that serves as the image processing system according to this embodiment. In FIG. 17, the copier system comprises: a feeder 1, for automatically feeding a document; a scanner 2, for reading image on a document placed on a platen glass (not shown); a network controller (NC) 4, for converting PDL data received via a LAN 3 into bit map image data; an image processor 5, for processing image data received from the scanner 2 or the NC 4; a printer 6, for printing image data processed by the image processor 5; and a image storage unit 7, for storing image data in a bit map form. The individual components are interconnected via a 1394 serial bus.

Figure 18:
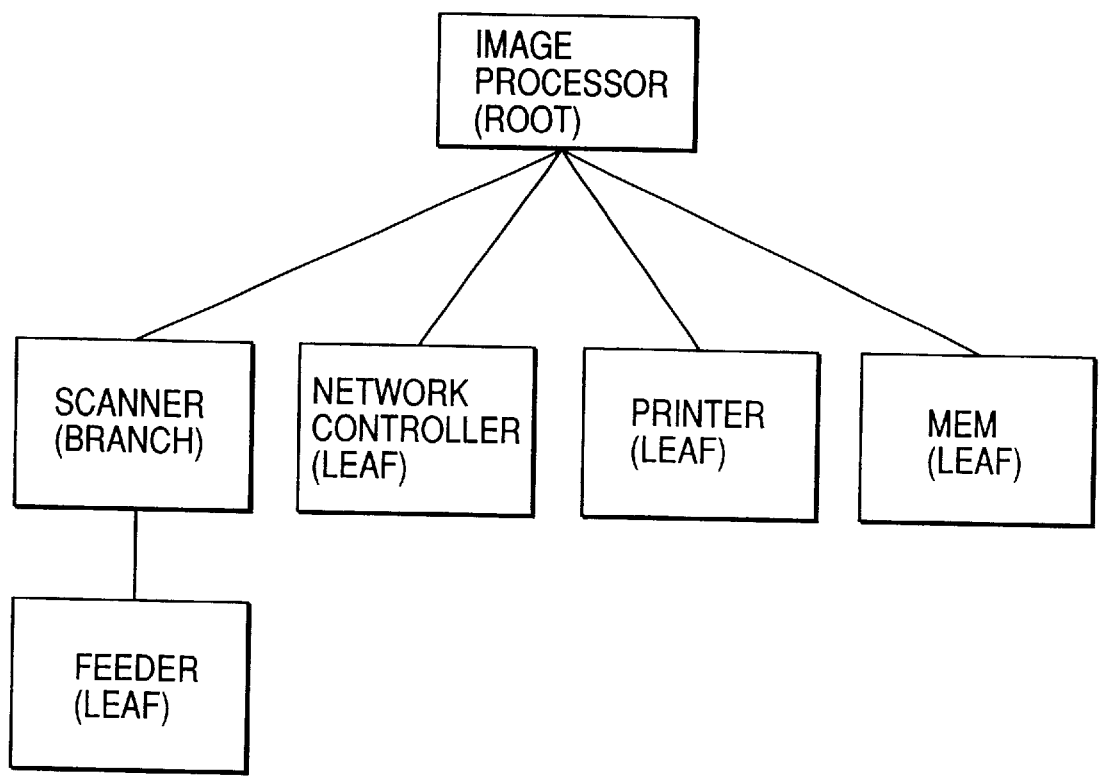
FIG. 18 is a diagram showing a network that comprises the components of the copier system shown in FIG. 17.

FIG. 18 is a diagram showing a network that is constituted by the components of the copier system in FIG. 17 and that serves as an image processing system. As is apparent from FIG. 18, in the following description the image processor 5 serves as the root, the scanner 2 serves as a branch, and the feeder 1, the network controller 4, the printer 6 and the image storage unit 7 serve as leaves.

Figure 19:
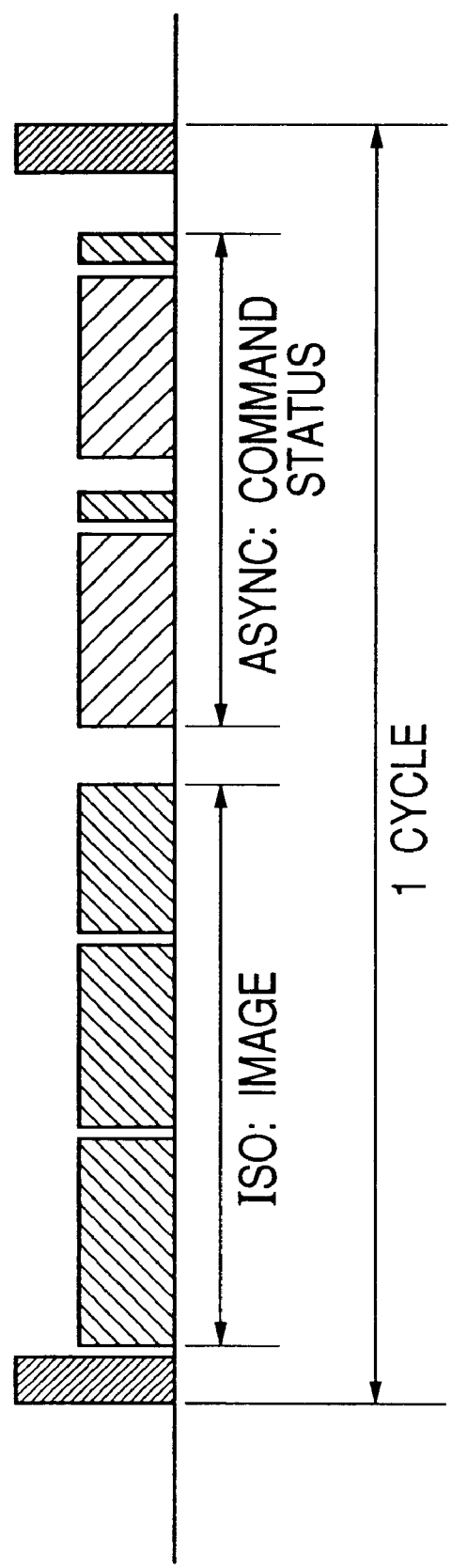
FIG. 19 is a specific diagram for explaining a bus cycle for image communication where one or more channels (channels e, s and k) are sued as image communication packets, and an Async packet is used for communication of a command or a status among modules.

In this embodiment, an isochronous packet for which one or more channels (channels e, s and k) are assigned is used for the transmission of image data to the individual components (modules), while an asynchronous packet is used for the communication of a command or a status to the modules. FIG. 19 is a specific diagram for explaining a bus cycle for the transmission of image data.

Figure 20:
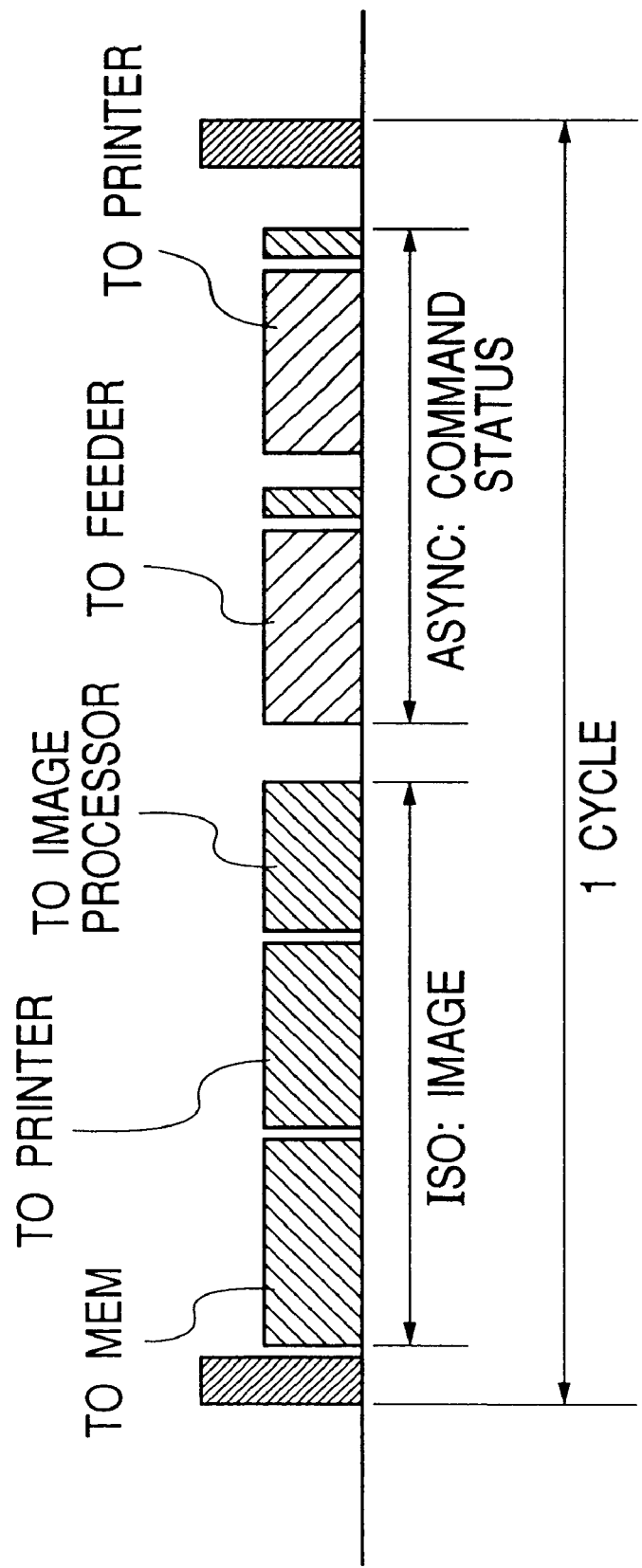
FIG. 20 is a specific diagram showing a bus cycle when two jobs are performed at the same time.

The amount of image data for a 24-bit image, called a full color image, for one A4 size sheet is approximately 100 MB with a resolution of 600 dpi. To transmit the image data to the printer 5 at a rate of six sheets a minute, the number of channels equivalent to 10 MB/sec=1.25 KB/cycle must be prepared for the image communication. Assuming that 1.25 KB/cycle can be prepared using one channel, and that a job for transmission of image data from "feeder 1 to scanner 2 to storage device 7" and a job for transmission of image data from "network controller 5 to image processor 3 to printer 6" are executed at the same time, a packet shown in FIG. 20 is transmitted at the speed of a bus cycle for the 1394 serial bus. FIG. 20 is a specific diagram showing a bus cycle when the two jobs are executed at the same time.

In the above calculation, the premise is that the right of use of the bus can always be obtained for a pertinent module during the image transmission. However, when the above described ordinary arbitration is performed, the right of use of the bus can not be obtained for each cycle. In a system that performs fair arbitration, which will be described later, when there is a job conflict and the bus resources are in short supply, the right of use of the bus can not be obtained by the same node each cycle.

The fair arbitration will now be explained. It should be noted that the arbitration is performed by the root at steps S406 and S407 in FIG. 16.

Figure 21:
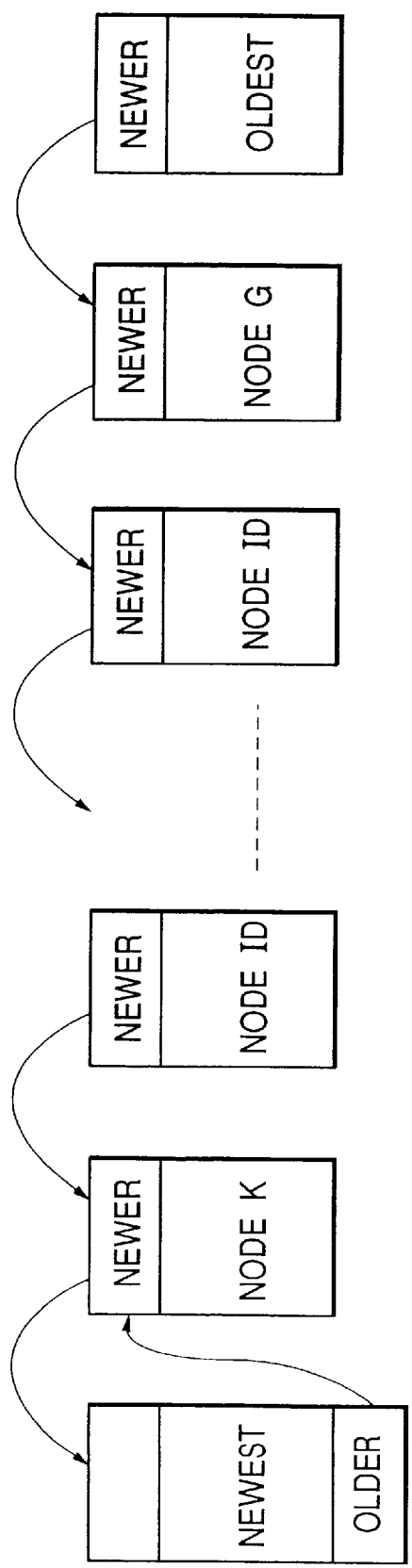
FIG. 21 is a link table showing, as a time series, nodes that obtain the right of use of the bus.
Figure 22:
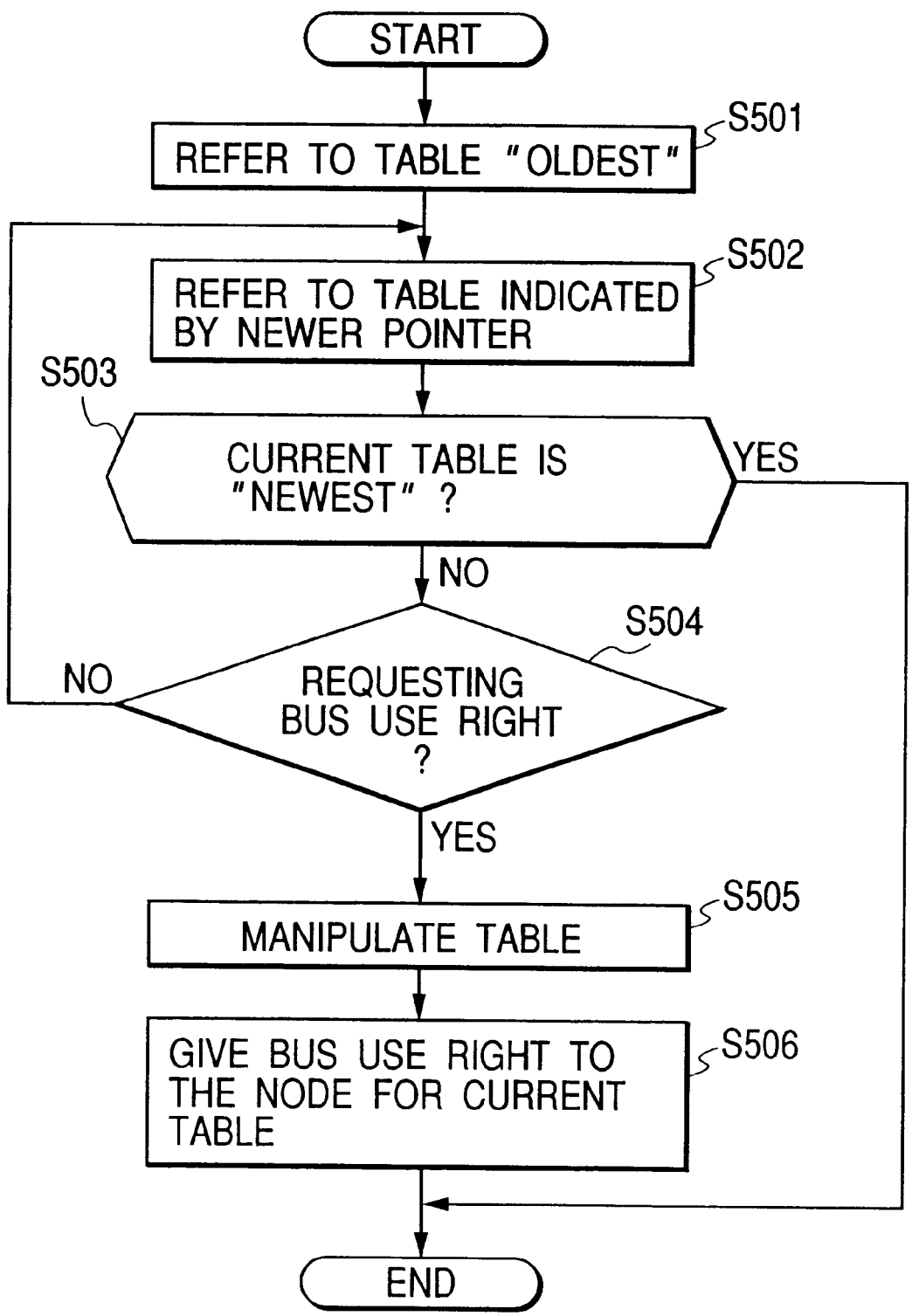
FIG. 22 is a flowchart showing the fair arbitration processing.

FIG. 21 is a link table showing as a time series nodes that obtain the right of use of the bus. FIG. 22 is a flowchart showing the determination processing performed as a result of the fair arbitration.

Since with fair arbitration the right (permission) of use of the bus is provided for the first node that was selected to use the bus, as is shown in FIG. 21 the bus acquisition nodes are arranged in the order beginning with the oldest.

An "Oldest" table is referred to in which is stored information concerning the first node that obtained the right of use of the bus (step S501). A search of a table pointed at by a Newer pointer is performed to determine whether there is a node that has not yet obtained the right of use of the bus (step S502). If such a node is found in the network (suppose this node is node G), a check is performed to determine whether the table that is currently referred to is a Newest table, in which is stored information concerning the latest node that obtained the right of use of the bus (step S503). When the current table is the Newest table, the arbitration need not be performed, and the processing is thereafter terminated.

When the result of the decision at step S503 is negative (NO), a check is performed to determine whether node G has issued a request for the right of use of the bus (step S504). When node G has issued a request, the table is manipulated to provide the right (permission) of use of the bus for node G (step S505). That is, the contents of the Newer pointer in node G in which its ID information is stored are copied to the Newer pointer of the Oldest area. Further, the address of node G is copied to the Newer pointer in the table that is pointed at by the Older pointer in the Newest area, in which is stored information concerning the latest node that has been granted the right of use of the bus. The address of node G is also copied to the Older pointer in the Newest area. In addition, the address in the Newest area is copied to the Newer pointer of node G. As a result, node G, which is granted the right of use of the bus, is treated as the latest node in the link table that obtained the right (permission) of use of the bus. After the manipulation of the table, the right of use of the bus is provided for a node that corresponds to the table that is currently referred to (step S506). The processing is thereafter terminated.

Even when node G is regarded as a node in the network that has not yet obtained the right of use of the bus, so long as node G does not request the right of use of the bus (the decision at step S504 is negative (NO)) the table pointed at by the Newer pointer in node G is examined at steps S502 to S504.

Assume that, in a copier system wherein six modules (A, B, C, D, E and F) that satisfy the requirements for performance during one cycle using one channel are connected to a network, and wherein fair arbitration is performed when for the bus only two channels are available for one cycle, three image data jobs are performed at the same time between modules A and B, C and D, and E and F.

Since only two channels can be obtained at the same time in this system, constantly, there is one job that can not obtain a channel. When the job for modules A and B, and then the job for modules C and D obtain the right of use of the bus, the job for modules C and D and the job for modules E and F obtain the right of use of the bus the next cycle, and the job for module A and B is placed on hold. At the succeeding cycle, the job for modules E and F and the job for module A and B obtain the right of use of the bus, and the job for module C and D is placed on hold. As a result, this copier system requires a ⅔ times higher image data transmission speed and 1.5 times longer transmission time, so that the original performance of the copier can not be exhibited and a real-time control job, such as a copy job, would be seriously affected.

Specifically, for a copy job that requests a high processing speed, it is assumed that the transmission of image data will be completed within a static, constant time period. The paper feeding process proceeds without waiting for the completion of the transmission of image data, and image printing is initiated, so that the time at which the transmission of image data has been completed corresponds to the time at which the printing process is completed. In the above described state, however, only ⅔ of the total image data has been transmitted by the time it is assumed that the printing process has been completed, and an incomplete print image is obtained.

In this embodiment, the time required for the transmission of image data is dynamically predicted, and the preceding paper feeding and the printing process are begun based on the predicted time. The following parameters are employed for such a prediction:

maximum channels in one cycle: C;

the number of jobs executed at the same time by the copier system in this embodiment: J;

the number of channels required for one cycle by a target job: N;

image data transmission performance of a target job: $P(C, J, N) = C/(J \times N)$, wherein when $P \geq 1$ the full performance can be exhibited, and when $P=0.5$ only half the original transmission speed can be obtained.

The predicted transmission completion time can be obtained as follows:

statically predicted transmission completion time:

$Ts$;

dynamically predicted transmission completion time:

$Td=Ts/P$ (when $P<1$), $Td=Ts$ (when $P \geq 1$).

Since in the above example C=2, J=3 and N=1, the performance P and the dynamically predicted time are $P=2/(3 \times 1)=2/3$, $Td=Ts/(2/3)=3/2$.

Figure 23:
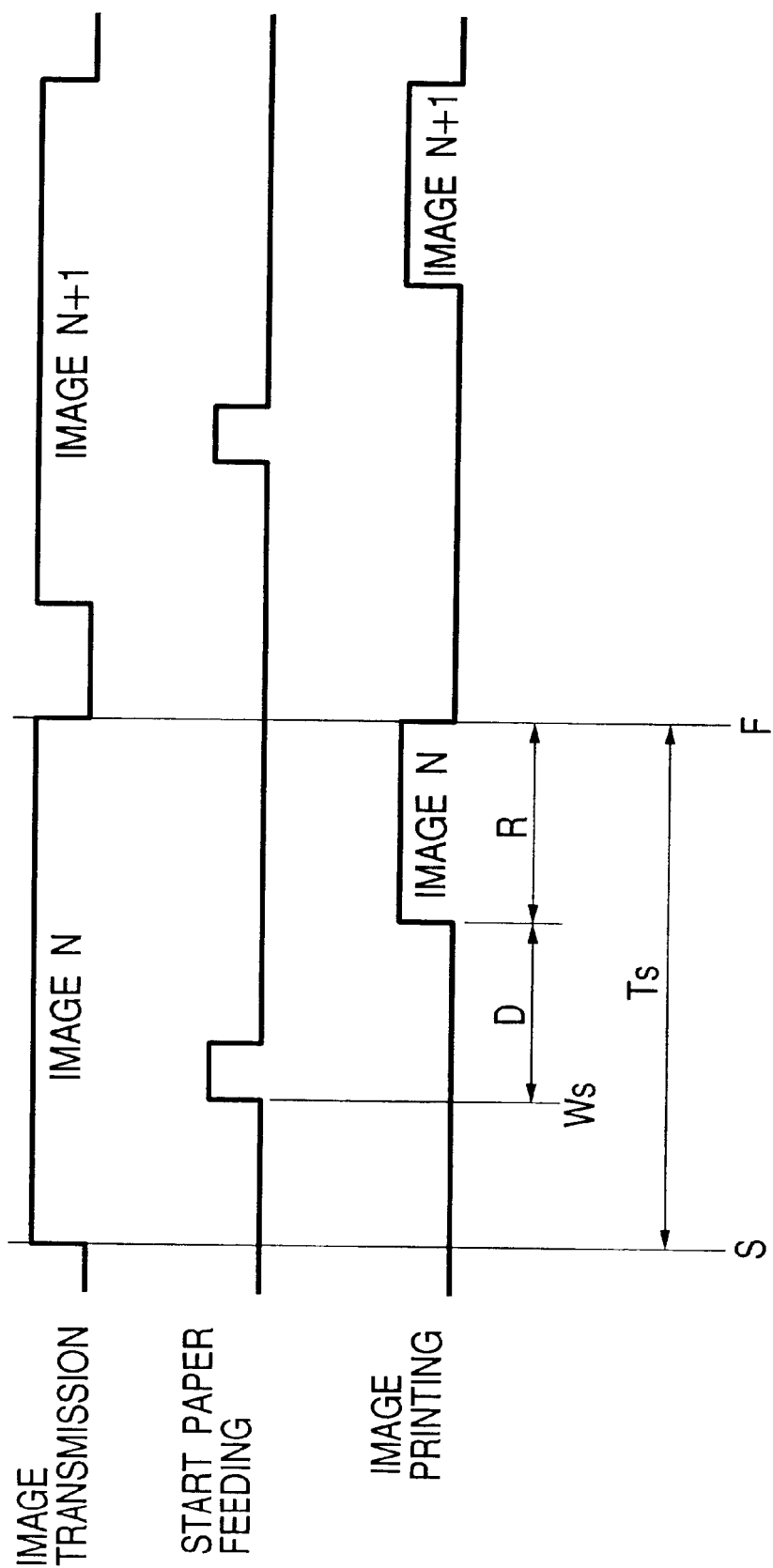
FIG. 23 is a timing chart showing timings concerning image transmission, paper feeding start and image printing processes of a job when the full performance can be exhibited.

An explanation will now be given for the preceding paper feeding process using such a dynamically predicted transmission completion time. FIG. 23 is a timing chart showing timings for the image data transmission, the paper feeding start and the image printing process for a specific job when the full performance can be demonstrated.

When the full performance can be demonstrated, the time required for image transmission equals the statically predicted time for the completion of the image data transmission. Timing Ws, by which the paper feeding proceeds the printing, is represented as follows:

$Ws=F-R-D$.

The following parameters are employed:
  image data transmission completion timing: F;
  sheet delivery time from a paper feeder to a printing unit: D;
  time required for the image printing process: R.
  Further, when the image data transmission start timing is defined as S, $F=S+Ts$, and the preceding paper feeding timing Ws is as follows:

$Ws=S+\{Ts-(D+R)\}$.

Therefore, it is apparent that, when the full performance in FIG. 23 can be demonstrated, the paper feeding must be started after the image data transmission start time following a delay that is equivalent to the duration of a period of time obtained by subtracting time D, required for the paper delivery, and time R, required for the image printing process, from time Ts, required for the image data transmission.

Figure 24:
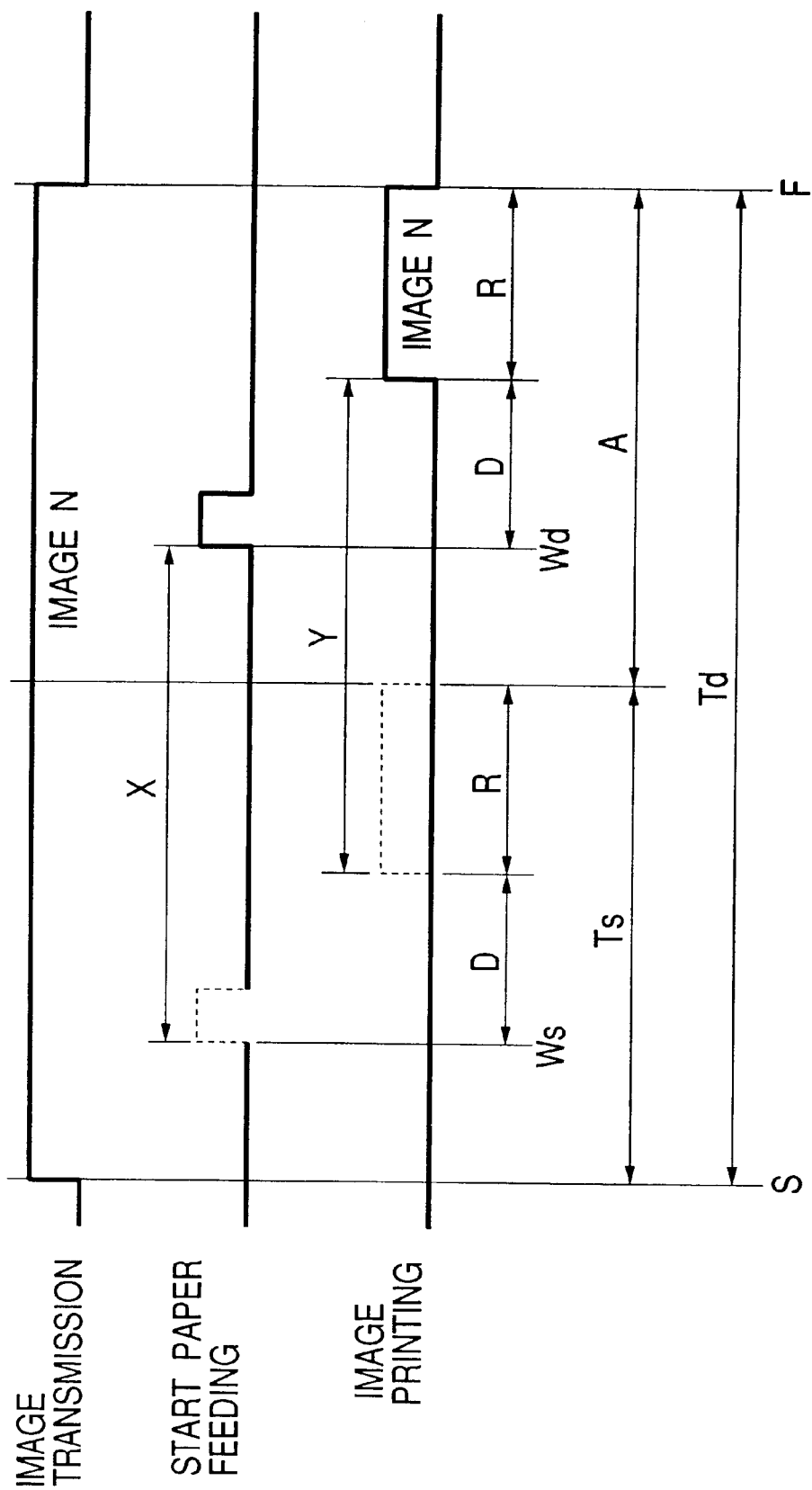
FIG. 24 is a timing chart showing timings concerning image transmission, paper feeding start and image printing processes of a specific job when the number of jobs is increased.

FIG. 24 is a timing chart showing the timings for image data transmission, the paper feeding start, and the image printing process for a specific job when the number of jobs is increased and an adequate number of channels are not available. The broken lines indicate timings at which the performance in FIG. 23 can be fully demonstrated.

In order to perform high-speed printing in this state without printing an incomplete image, image data transmission completion timing F must correspond to the image printing end timing.

Specifically, since the time required hereafter for paper feeding timing Wd is a constant (D+R), paper feeding timing Wd is dynamically changed by setting a delay time equal to predicted time Td for the completion of the image data transmission. Essentially, the idea is the same as that for the example explained while referring to FIG. 22.

First, timing Wd for the dynamic preceding paper feeding is represented as follows:

$Wd=S+\{Td-(D+R)\}$.

Since it is understood that Td is Ts/P (P<1), the above equation can be modified as follows:

$$Wd = S + \{Ts/P - (D+R)\}$$
$$= S + \{Td - (D+R)\} + Ts \times (1/P - 1)$$
$$= Ws + Ts \times (1/P - 1).$$

When this equation is substituted into the equation concerning performance P, delay X, the time which must elapse before ideal paper feeding timing Ws is reached, is represented as follows:

$$X = Wd - Ws$$
$$= Ts \times (1/P - 1)$$
$$= Ts \times \{(J \times N)/C - 1\}.$$

As is described above, so long as the number J of jobs, which are executed by the copier system at the same time, and the number N of channels, which are required for one cycle by a target job, are obtained, dynamic paper feeding timing Wd can be acquired from ideal paper feeding timing Ws.

In addition, as paper feeding timing Td is delayed a period of time equivalent to delay time X, accordingly, the printing start timing is delayed a like period of time.

Since paper is fed while the preceding paper feeding timing Wd is delayed the equivalent of the thus obtained delay time X, and accordingly, the printing start timing is delayed, incomplete image printing can be prevented.

As is described above, according to this embodiment, the 1394 serial bus is employed for the transmission of image data and a command status. Since an isochronous packet for which a predetermined number of channels is assigned is employed for the transmission of image data, and an asynchronous packet is employed for the transmission of a command status, both the image data and the status command can be transmitted across a single serial bus. When an adequate number of channels for one cycle is not available for the transmission of image data, and thus a job conflict exists, delay time X, for the time required for the transmission of image data is predicted, and the operating timing for the printing process (the preceding paper feeding timing and the printing start timing in this embodiment) is dynamically changed. Therefore, an image processing apparatus can be provided that can be operated at a high speed, even when conflicts develop among jobs.

As is described above, according to this embodiment, a plurality of modules are connected together via a high-speed serial bus, along which at least one isochronous packet and at least one asynchronous packet, which are assigned for a predetermined number of channels, can be sequentially transmitted during a single transmission cycle; image data are transmitted to the plurality of modules by assigning to the isochronous packet the transmission to the modules of image data, and by assigning to the asynchronous packet the transmission of a command status; whether the number of channels available during a single cycle is adequate for the execution of a job, including the transmission of image data, is determined; a delay time is predicted for the time required before the transmission of the image data included in the job is completed, when the determination means ascertains that the number of channels available is not adequate; and an operating timing for a destination module for the image data is dynamically changed in accordance with the delay time that is predicted. As a result, command statuses and a large quantity of color image data can be transmitted by using a single serial bus, and even when conflicts develop among a plurality of jobs, the processing can be performed at a high speed.

According to this embodiment, the operating timing is defined as a timing for supplying to the image output means an output medium for the printing of images. Therefore, even when there is a job conflict, an adequate preceding paper feeding timing can be controlled relative to the transmission timing for the image data, and constant, continuous printing can be performed at a high speed.

According to this embodiment, the operating timing is defined as a timing for the outputting of images by the image output means. Therefore, even when there is a job conflict, an adequate preceding paper feeding timing can be controlled relative to the transmission timing for the image data, and constant, continuous printing can be performed at a high speed.

According to this embodiment, when a plurality of jobs, including the transmission of image data, occur, different channels are assigned for these jobs. As a result, the real time transmission of image data to a plurality of modules can be performed at the same time.

According to this embodiment, since the number of channels assigned for an isochronous packet is changed in accordance with the processing speed of the modules, image data can be constantly and continuously transmitted at a high speed.

According to the embodiment, included in a plurality of modules are modules having different processing speeds, and when image data is transmitted to these modules, the processing speed of the module having the lowest speed is employed. Therefore, the image data can be constantly and continuously transmitted at as high a speed as is possible.

Second Embodiment

Figure 25:
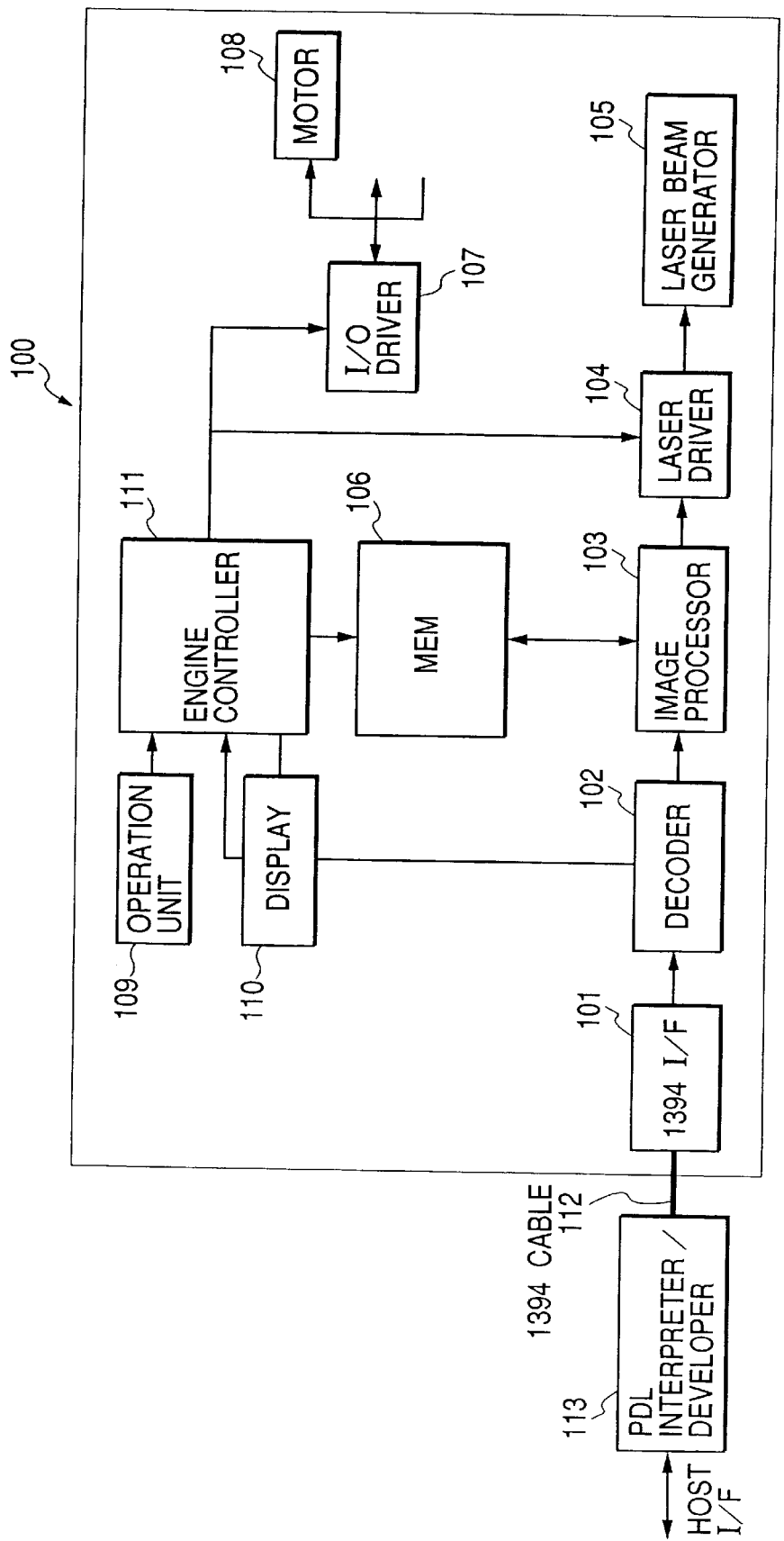
FIG. 25 is a block diagram illustrating the arrangement of a printer that serves as an image processing apparatus to which an image data transmission compensation device according to a second embodiment of the present invention is applied.

FIG. 25 is a block diagram illustrating the arrangement of a printer that serves as an image processing apparatus to which is applied an image data transmission compensation device according to a second embodiment of the present invention. In FIG. 25, a printer 100 (e.g., a laser beam printer (LBP)) comprises: a 1394 I/F (interface) 101, a decoder 102, an image processor 103, a laser driver 104, a laser beam generator 105, a memory 106, an I/O driver 107, a motor 108, an operation unit 109, a display unit 110, and an engine controller 111.

The 1394 I/F 101 is connected to a PDL interpreter/developer 113 via a 1394 cable 1112, and performs processing up to an IEEE 1394 transaction layer. The processing performed will be described in detail later. The decoder 102 receives a packet in accordance with the IEEE 1394 protocol, and decodes it in order to extract control data and image data from the result. The image processor 103 processes the decoded image data to obtain appropriate data that can be handled by a marking unit that prints images. The laser driver 104 converts the image data that have been processed, in consonance with the characteristic of the engine, to obtain an electric signal that actually drives the laser printer 100.

The laser beam generator 105 generates a laser beam in accordance with the electric signal obtained by the laser driver 104. The laser beam emitted by the laser beam generator 105 is projected through a scanner lens onto a reflection mirror, and from there onto a photosensitive drum (none of them shown) on which an electrostatic latent image is formed. Then, an image is formed on a recording medium, such as paper, by conventional electrophotographic processing (since this is a well known process, no explanation for it will be given). The memory 106 is used as a buffer for the rearranging of image data or for the temporary storage of it. The I/O driver 107 drives the motor 108 to rotate the photosensitive drum, and a scanner motor (not shown) to drive the scanner lens. The operation unit 109 is a unit that can be manipulated to provide various setups for the printer 100.

The display unit 110 displays various types of information, such as the status of the printer 100. The engine controller 111 controls the entire printer 100, and controls the collective individual components.

The PDL interpreter/developer 113 interprets and develops a print description language (PDL) received from a host interface (host I/F).

In the thus arranged printer 100, a signal received via the host I/F, such as the IEEE 1394 interface, is transmitted to the laser driver 104 via the PDL interpreter developer 113, the 1394 cable 112 the 1394 I/F 101, the decoder 102 and the image processor 103. In some cases, the transmission bandwidth for image data that are transmitted by the host I/F, such as the IEEE 1394, is narrower than is the one required due to a restriction in the electrophotographic process that is used, such as the restriction that a latent image for an entire page must be formed once the formation of an electrostatic latent image is begun on the photosensitive drum (the formation of an image on the photosensitive drum can not be halted until the processing for the page is completed). In this case, image data can not be transmitted to the laser driver 104 at a specific time.

In such a case, since a normal latent image is not formed, accordingly, the final image formed on the recording medium differs from the desired image.

In order to prevent the occurrence of such defect, the PDL interpreter/developer 113, which is the source of the transmission of image data, must predict the image data transmission capability, and must change the image data reception method in accordance with the predicted data.

Figure 26:
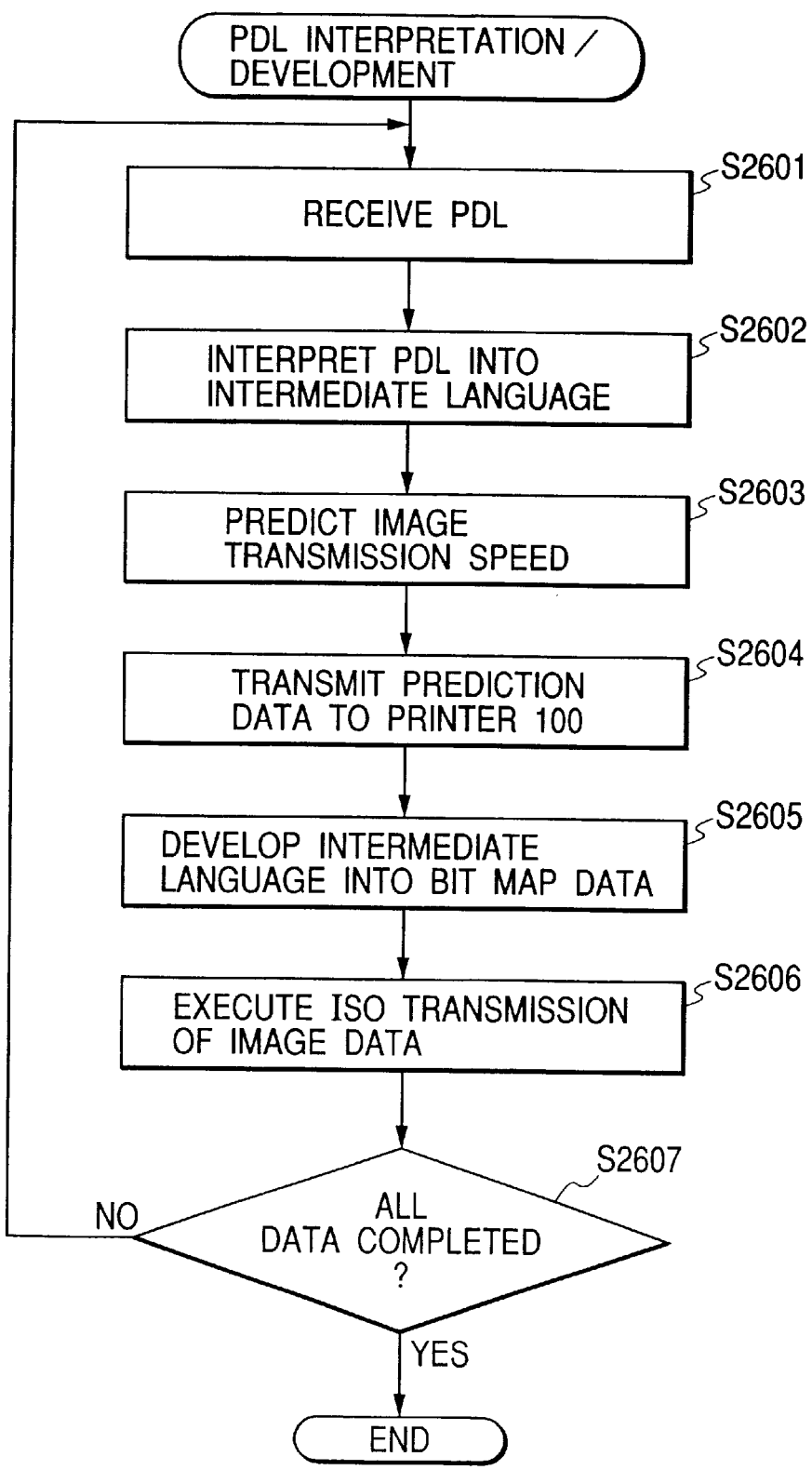
FIG. 26 is a flowchart showing the processing performed by a PDL interpreter/developer in FIG. 25.
Figure 27:
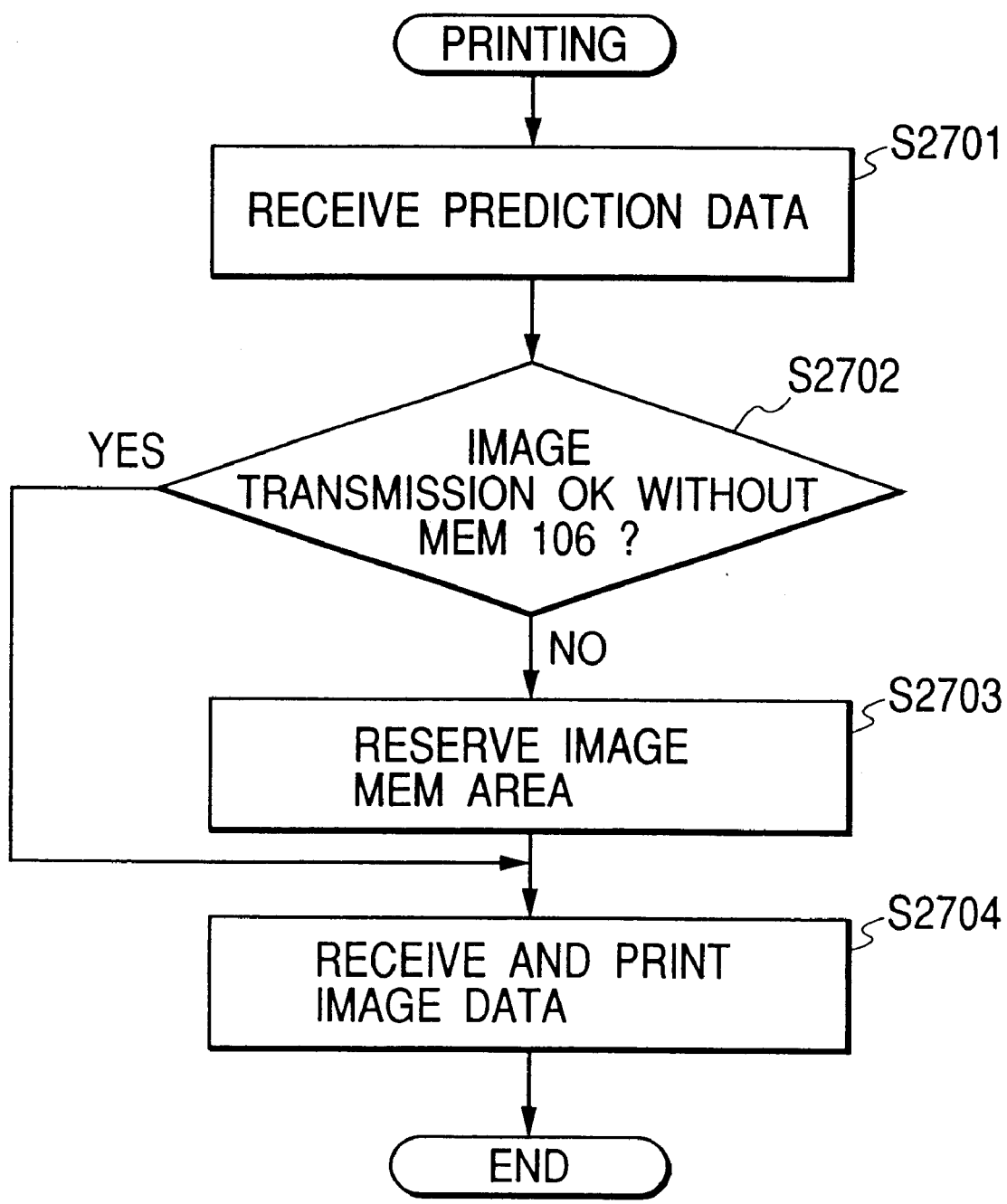
FIG. 27 is a flowchart showing the processing performed by the printer in FIG. 25.

The processing for changing the image data reception method will now be described while referring to the flowcharts in FIGS. 26 and 27.

The processing performed by the PDL interpreter/developer 113 will now be described while referring to FIG. 26. At step S2601 the PDL reception process is performed, and upon the receipt of the PDL, at step S2602 the PDL is interpreted to produce an intermediate language. At step S2603, based on the result of the interpretation at step S2602, the image transmission speed (development time) is predicted from the resolution for and the complexity of an image. At step S2604 the data predicted at step S2603 are transmitted to the printer 100. At step S2605 the intermediate language is developed into a bit map, and at step S2606 the isochronous image data are transmitted, a process which will be described later. At step S2607 a check is performed to determine whether all the data have been processed. If all the data have not yet been processed, program control returns to step S2601, and the above processing is repeated. When all the data have been processed, the processing is terminated.

The processing performed by the printer 100 to receive developed data will now be described while referring to FIG. 27. At step S2701 the printer 100 receives predicted data that are transmitted by the PDL interpreter/developer 113 at step S2604. At step S2702 a check is performed, by referring to the predicted data, to determine whether without using the memory 106 the transmission of an image will be successful. When the transmission will not be successful, at step S2703 an image memory area is obtained based on the predicted data, and program control advances to step S2704. When, at step S2702, the transmission of image data will be successful, program control skips step S2703 and moves to step S2704. At step S2704 the image data, while being received, are printed, and the processing is thereafter terminated.

As is described above in detail, according to the image data transmission compensation method and the apparatus of the present invention, when the data transmission time for a common serial bus is ascertained, i.e., when isochronous image data are to be transmitted to the image processing apparatus, the image data transmission side predicts whether transmission of the image data will be successful, and transmits the results to the image processing apparatus. Then, based on the received results, the image processing apparatus changes the image data reception system. As a result, the image data to be transmitted are compensated for, and accordingly, the reliability of the image processing apparatus can be improved.

Third Embodiment

A third embodiment of the present invention will now be described while referring to FIGS. 28 and 29.

Figure 28:
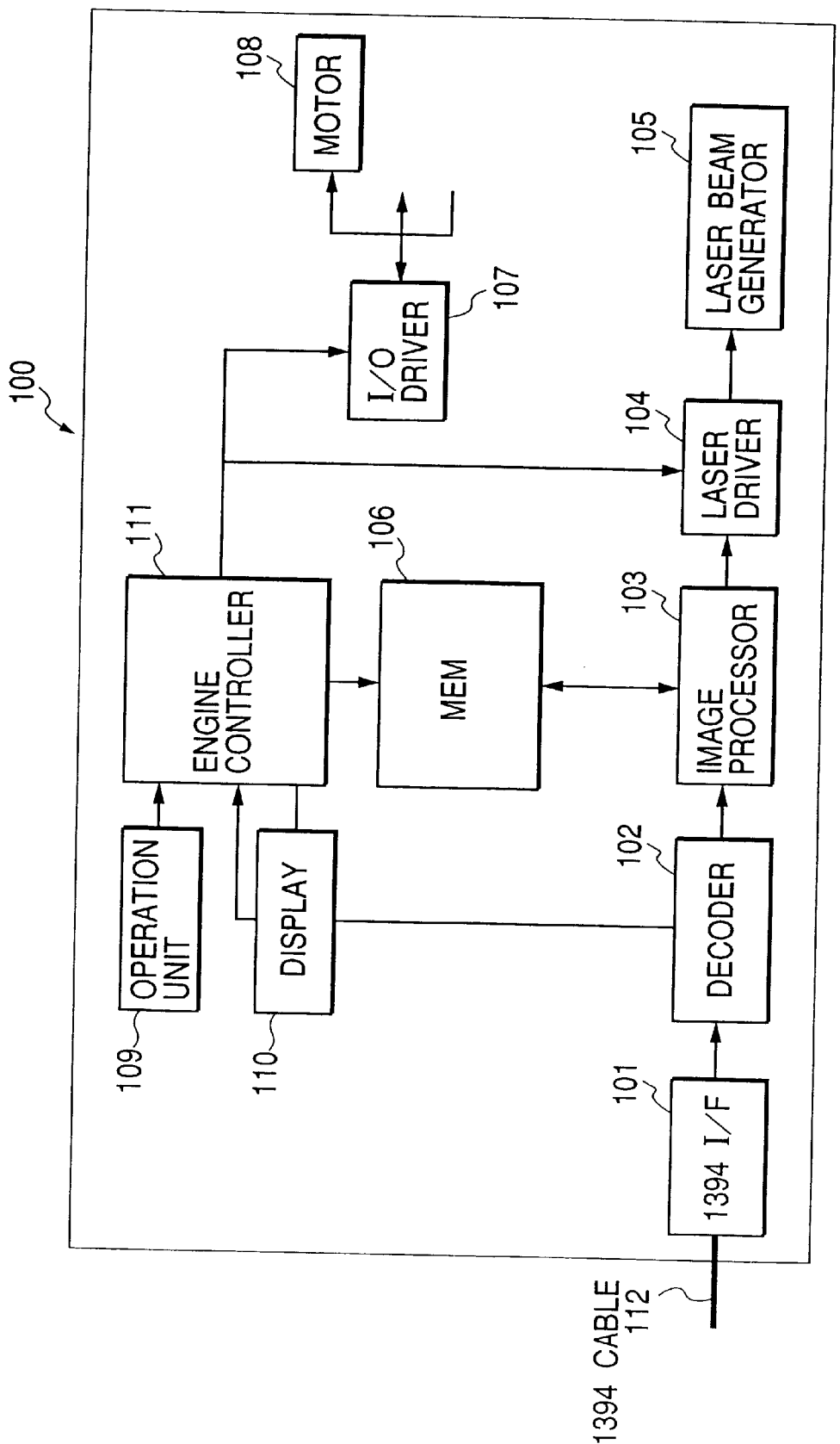
FIG. 28 is a block diagram illustrating the arrangement of a printer that serves as an image processing apparatus to which an image data transmission compensation device according to a third embodiment of the present invention is applied.
Figure 29:
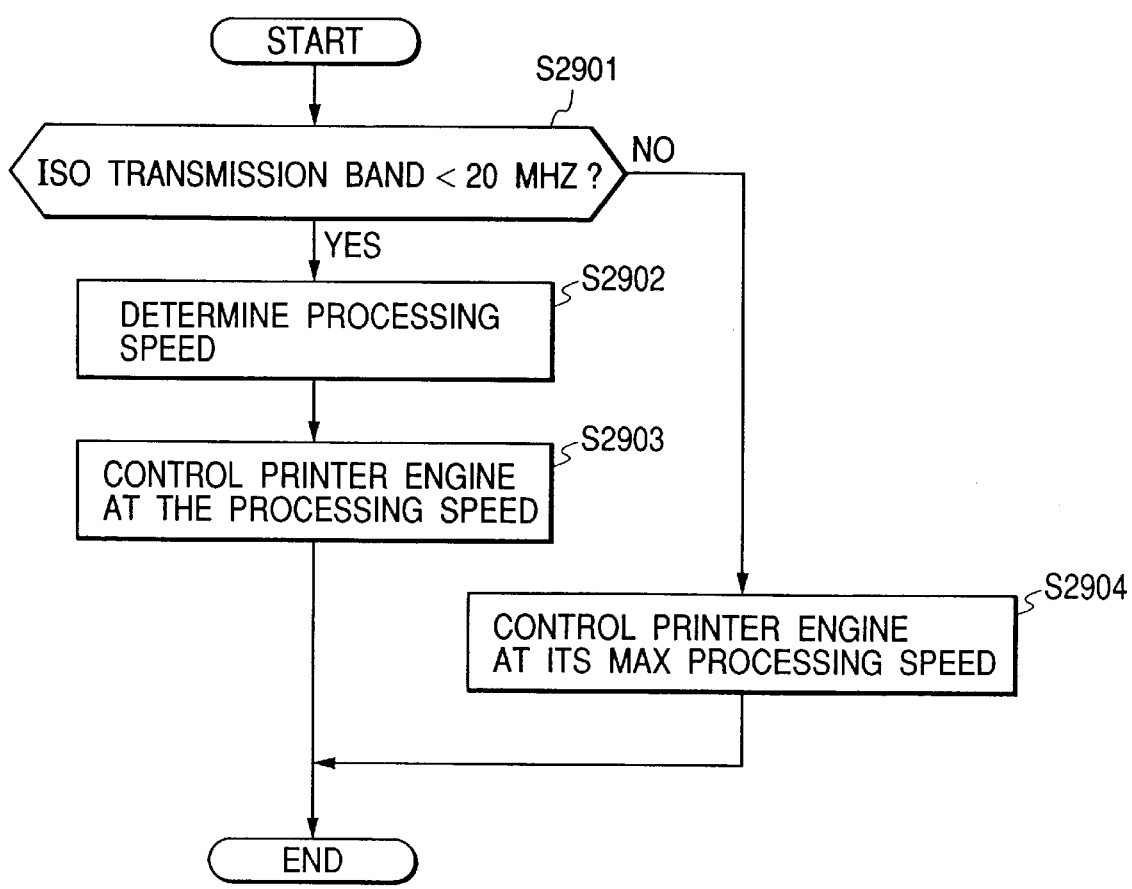
FIG. 29 is a flowchart showing the processing performed by a PDL interpreter/developer in FIG. 28.

FIG. 28 is a block diagram illustrating the arrangement of a printer that serves as an image processing apparatus to which is applied an image data transmission compensation device according to a third embodiment of the present invention. In FIG. 28, a printer 100 (e.g., a laser beam printer (LBP)) comprises: a 1394 I/F (interface) 101, a decoder 102, an image processor 103, a laser driver 104, a laser beam generator 105, a memory 106, an I/O driver 107, a motor 108, an operation unit 109, a display unit 110, and an engine controller 111.

The 1394 I/F 101 is connected to an external apparatus (not shown), such as a host computer, via a 1394 cable 1112, and performs processing up to an IEEE 1394 transaction layer. The processing performed will be described in detail later. The decoder 102 receives a packet in accordance with the IEEE 1394 protocol, and decodes it in order to extract control data and image data from the result. The image processor 103 processes the decoded image data to obtain appropriate data that can be handled by a marking unit that prints images. The typical processing for a binary printer is processing for obtaining binary image data and for rearranging image data in order at which they are to be printed. The laser driver 104 converts the image data that have been processed, in consonance with the characteristic of the engine, to obtain an electric signal that actually drives the laser printer 100.

The laser beam generator 105 generates a laser beam in accordance with the electric signal obtained by the laser driver 104. The laser beam emitted by the laser beam generator 105 is projected through a scanner lens onto a reflection mirror, and from there onto a photosensitive drum (none of them shown) on which an electrostatic latent image is formed. Then, an image is formed on a recording medium, such as paper, by conventional electrophotographic processing (since this is a well known process, no explanation for it will be given). The memory 106 is used as a buffer for the rearranging of image data or for the temporary storage of it. The I/O driver 107 drives the motor 108 to rotate the photosensitive drum, and a scanner motor (not shown) to drive the scanner lens. The operation unit 109 is a unit that can be manipulated to provide various setups for the printer 100.

The display unit 110 displays various types of information, such as the status of the printer 100. The engine controller 111 controls the entire printer 100, and controls the collective individual components.

In the thus arranged printer 100, a signal received via the host I/F, such as the IEEE 1394 interface, is transmitted to the laser driver 104 via a protocol interpreter (not shown), the 1394 cable 112 the 1394 I/F 101, the decoder 102 and the image processor 103. In some cases, the transmission bandwidth for image data that are transmitted by the host I/F, such as the IEEE 1394, is narrower than is the one required due to a restriction in the electrophotographic process that is used, such as the restriction that a latent image for an entire page must be formed once the formation of an electrostatic latent image is begun on the photosensitive drum (the formation of an image on the photosensitive drum can not be halted until the processing for the page is completed). In this case, image data can not be transmitted to the laser driver 104 at a specific time.

In such a case, since a normal latent image is not formed, accordingly, the final image formed on the recording medium differs from the desired image.

Thus, in order to prevent the occurrence of such a defect, the electrophotographic processing speed, typically the rotational speed of a photosensitive drum (not shown), must be changed in accordance with the bandwidth for transmission of image data that has been obtained in advance.

The processing for changing the electrophotographic processing speed will now be described while referring to FIG. 29.

First, after an isochronous resource management node determines a bandwidth for the transmission of isochronous data, at step S2901 a check is performed to determine whether the bandwidth is lower than 20 MHz (e.g., a condition required for the printing of 20 images at 600 dpi, and a processing speed of 105 mm/sec during printing). When the transmission bandwidth is lower than 20 MHz, the supply of data will be inadequate when printing is performed at the maximum printer speed. Thus, at step S2902 the processing speed is determined in order to provide a reduced processing speed during the printing. For this, the following calculation equation is employed:

$$\text{processing speed [mm/sec]} = \text{transmission bandwidth [Hz]}/(23.62 \times 600 \times \text{main scan length}).$$

Following this, at step S2903 the printer engine is controlled at the processing speed that is determined at step S2902 (since the control method is well known, no explanation for it will be given). The processing is thereafter terminated.

When, at step S2901, the transmission bandwidth is not lower than 20 MHz, at step S2904 the printer engine is controlled at its normal, maximum processing speed. The processing is thereafter terminated.

As a result, multiple image processing apparatuses can be connected to the IEEE 1394 serial bus, so that the printing process need not be suspended or be halted, even when the isochronous data transmission bandwidth for a image processing apparatus is narrowed.

Since the processing speed during the printing at steps S2903 and S2904 is not specified in the initial (standard) IEEE 1394 protocol, it is provided as a protocol that is inherent to the printer.

Fourth Embodiment

A fourth embodiment of the present invention will now be described.

Since the basic arrangement as in shown in FIG. 28 for the third embodiment is employed for an image data transmission compensation apparatus according to this embodiment, the same drawings are used for the explanation.

Figure 30:
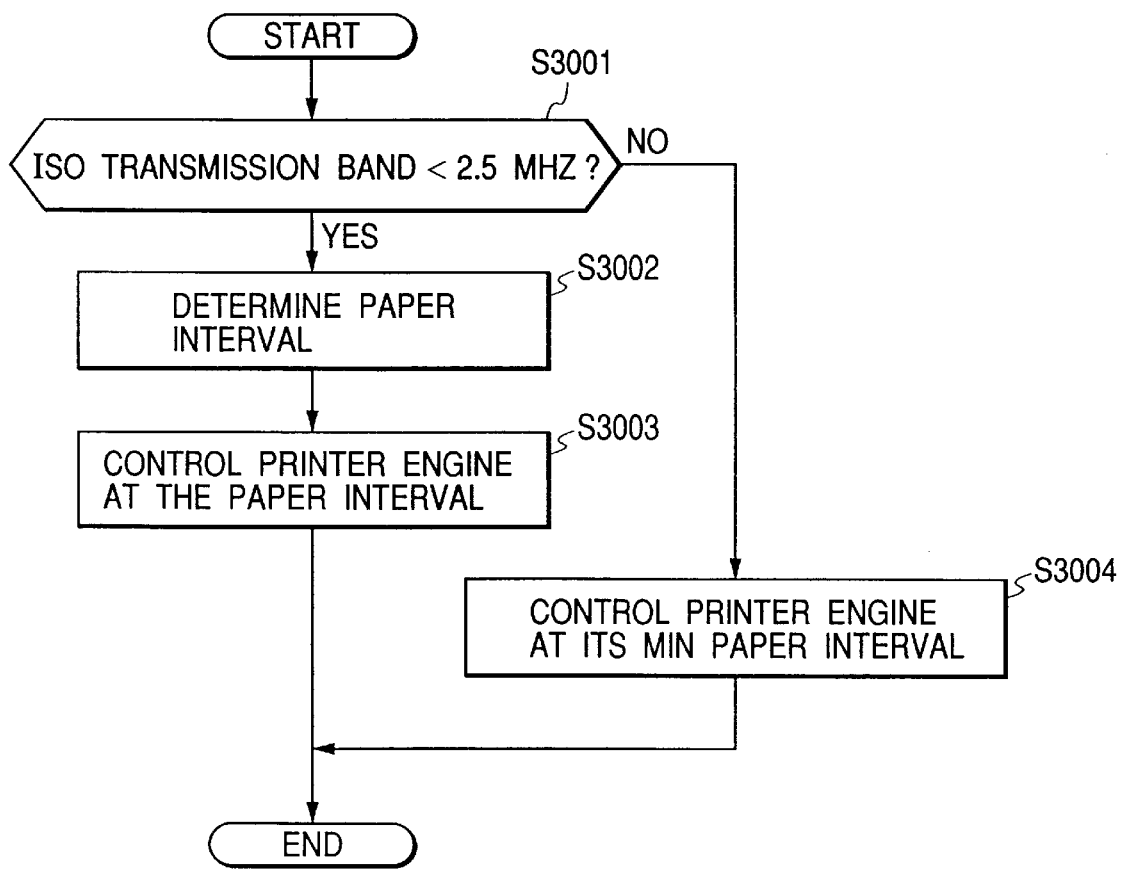
FIG. 30 is a flowchart showing the processing performed by a PDL interpreter/developer in a printer that serves as an image processing apparatus to which an image data transmission compensation device according to a fourth embodiment of the present invention is applied.

While in the third embodiment, the printer engine is controlled by using a processing speed that is determined, in this embodiment, the printer engine is controlled by using an interval between feeding of one paper and feeding of the next paper, which will be referred to "paper interval". This processing will be described while referring to the flowchart in FIG. 30.

First, after an isochronous resource management node determines a bandwidth for the transmission of isochronous data, at step S3001 a check is performed to determine whether the bandwidth is lower than 2.5 MHz (e.g., a condition required for the printing of 20 images at 600 dpi, and a processing speed of 105 mm/sec during printing). When the transmission bandwidth is lower than 2.5 MHz, the supply of data will be inadequate when printing is performed at the maximum printer speed. Thus, at step S3002 the processing speed is determined in order to increase a paper interval during the printing. For this, the following calculation equation is employed:

[Normal case: A4 size paper]

paper interval [sec]
=60/20−sub-scan length/process speed
=60/20−210/105=1.000

[when transmission bandwidth is lower than 20 MHz]

paper interval [sec]
={main scan resolution [dpm]×main scan length [mm]×sub-scan resolution [dpm]×sub-scan length [mm]/transmission bandwidth [Hz]}−210/105
={11.69×297×8.23×210/transmission bandwidth [Hz]}−210/105

[dpm=dot/mm]

Following this, at step S3003 the printer engine is controlled at the paper interval that is determined at step S3002 (since the control method is well known, no explanation for it will be given). The processing is thereafter terminated.

When, at step S3001, the transmission bandwidth is not lower than 2.5 MHz, at step S3004 the printer engine is controlled at its normal, minimum paper interval (maximum processing speed of the printer engine). The processing is thereafter terminated.

As a result, multiple image processing apparatuses can be connected to the IEEE 1394 serial bus, so that the printing process need not be suspended or be halted, even when the isochronous data transmission bandwidth for a image processing apparatus is narrowed.

Since the paper interval during the printing at steps S3003 and S3004 is not specified in the initial (standard) IEEE 1394 protocol, it is provided as a protocol that is inherent to the printer.

As is described above, according to the image data transmission compensation method and apparatus, before image data are to be transmitted to the image processing apparatus in accordance with a transmission method for ascertaining a data transmission time using the common serial bus, i.e., by using the isochronous transmission method, the image data transmission side makes a prediction as to whether the transmission of the image data can be performed successfully, and transmits the results to the image processing apparatus. The image processing apparatus changes the image data reception method based on the received results. Therefore, the image data that are to be transmitted can be ascertained, and accordingly, the reliability of an image processing apparatus can be improved.

What is claimed is:

1. An image processing apparatus, which is connected via a predetermined interface, comprising:

prediction means for, in accordance with a use state of the interface, predicting an end time for transmission of image data for a target job of a plurality of jobs that are executed at a same time; and control means for controlling a timing for an output operation, in accordance with a result obtained by said prediction means, wherein the interface is an IEEE 1394 serial bus.

2. An image processing apparatus according to claim 1, further comprising image output means for outputting an image based on the image data.

3. An image processing apparatus according to claim 1, wherein the output operation is a preceding paper feeding operation.

4. An image processing apparatus according to claim 1, wherein the output operation is a printing operation.

5. An image processing apparatus according to claim 1, wherein the plurality of jobs that are executed at the same time includes a scan job, a print job, and a copy job.

6. An image processing apparatus according to claim 1, further comprising scan means for scanning an image in a document.

7. An image processing apparatus according to claim 1, wherein said prediction means predicts the end time in accordance with a maximum number of channels in one cycle, a number of jobs to be performed at a same time, and a number of channels that are required during one cycle by the target job.

8. An image processing apparatus, which is connected via a predetermined interface, comprising:

determination means for, based on predicted data, determining whether image transmission will be successful without a buffer memory being used; and reception means for, when said determination means determines that the buffer memory is not required for the image transmission, receiving image data without using the buffer memory, and for, when said determination means determines that the buffer memory is required for the image transmission, using the buffer memory and receiving said image data, wherein the interface is an IEEE 1394 serial bus.

9. An image processing apparatus according to claim 8, further comprising image output means for outputting an image based on the image data.

10. An image processing apparatus according to claim 8, wherein the predicted data is an image transmission time that is predicted in accordance with a result obtained by a PDL interpretation.

11. An image processing apparatus according to claim 8, wherein the predicted data is an image transmission time based on a resolution and a complexity of the image data.

12. An image processing apparatus according to claim 8, further comprising preparation means for preparing the predicted data.

13. An image processing apparatus, which is connected via a predetermined interface, comprising:

determination means for determining whether an obtained bandwidth is satisfactorily high; and control means for, when said determination means determines that the bandwidth is satisfactorily high, controlling a printer engine so as to perform printing at a maximum processing speed, and for, when said determination means determines that the bandwidth is not satisfactorily high, determining a processing speed in accordance with the obtained bandwidth and controlling the printer engine so as to perform printing at the determined processing speed, wherein the interface is an IEEE 1394 serial bus.

14. An image processing apparatus according to claim 13, wherein said apparatus further comprises the printer engine.

15. An image processing apparatus, which is connected via a predetermined interface, comprising:

determination means for determining whether an obtained bandwidth is satisfactorily high; and control means for, when said determination means determines that the bandwidth is satisfactorily high, controlling a printer engine so as to perform printing at a minimum paper interval, and for, when said determination means determines that the bandwidth is not satisfactorily high, determining a paper interval in accordance with the obtained bandwidth and controlling the printer engine so as to perform printing at the determined paper interval, wherein the interface is an IEEE 1394 serial bus.

16. An image processing apparatus according to claim 15, wherein said apparatus further comprises the printer engine.

17. A control method, for an image processing apparatus that is connected via a predetermined interface, comprising:

a prediction step of, in accordance with a use state of the interface, predicting an end time for transmission of image data for a target job of a plurality of jobs that are executed at a same time; and a control step of controlling a timing for an output operation, in accordance with a result obtained at said prediction step, wherein the interface is an IEEE 1394 serial bus.

18. A control method according to claim 17, further comprising an image output step of outputting an image based on the image data.

19. A control method according to claim 17, wherein the output operation is a preceding paper feeding operation.

20. A control method according to claim 17, wherein the output operation is a printing operation.

21. A control method according to claim 17, wherein the plurality of jobs that are executed at the same time include a scan job, a print job, and a copy job.

22. A control method according to claim 17, further comprising a scan step of scanning an image in a document.

23. A control method according to claim 17, wherein, in said prediction step, the end time is predicted in accordance with a maximum number of channels in one cycle, a number of jobs to be performed at a same time, and a number of channels that are required during one cycle by the target job.

24. A control method, for an image processing apparatus that is connected via a predetermined interface, comprising:

a determination step of, based on predicted data, determining whether image transmission will be successful without a buffer memory being used; and a reception step of, when it is determined in said determination step that the buffer memory is not required for the image transmission, receiving image data without using the buffer memory, and of, when it is determined in said determination step that the buffer memory is required for the image transmission, using the buffer memory and receiving the image data, wherein the interface is an IEEE 1394 serial bus.

25. A control method according to claim 24, further comprising an image output step of outputting an image based on the image data.

26. A control method according to claim 24, wherein the predicted data is an image transmission time that is predicted in accordance with a result obtained by a PDL interpretation.

27. A control method according to claim 24, wherein the predicted data is an image transmission time based on a resolution and a complexity of the image data.

28. A control method according to claim 24, further comprising a preparation step of preparing the predicted data.

29. A control method, for an image processing apparatus that is connected via a predetermined interface, comprising:

a determination step of determining whether an obtained bandwidth is satisfactorily high; and a control step of, when it is determined in said determination step that the bandwidth is satisfactorily high, controlling a printer engine so as to perform printing at a maximum processing speed, and of, when it is determined in said determination step that the bandwidth is not satisfactorily high, determining a processing speed in accordance with the obtained bandwidth and controlling the printer engine so as to perform printing at the determined processing speed, wherein the interface is an IEEE 1394 serial bus.

30. A control method according to claim 29, wherein the printer engine executes printing via an electrophotographic process.

31. A control method, for an image processing apparatus that is connected via a predetermined interface, comprising:

a determination step of determining whether an obtained bandwidth is satisfactorily high; and a control step of, when it is determined in said determination step that the bandwidth is satisfactorily high, controlling a printer engine so as to perform printing at a minimum paper interval, and of, when it is determined in said determination step that the bandwidth is not satisfactorily high, determining a paper interval in accordance with the obtained bandwidth and controlling the printer engine so as to perform printing at the determined paper interval, wherein the interface is an IEEE 1394 serial bus.

32. A control method according to claim 31, wherein the apparatus comprises the printer engine.

* * * * *

UNITED STATES PATENT AND TRADEMARK OFFICE
CERTIFICATE OF CORRECTION

PATENT NO. : 6,636,327 B2  Page 1 of 1
DATED : October 21, 2003
INVENTOR(S) : Hiroyoshi Yoshida et al.

It is certified that error appears in the above-identified patent and that said Letters Patent is hereby corrected as shown below:

<u>Title page,</u>
Insert item:
-- [*] Notice: This patent issued on a continuation prosecution application filed under 37 CFR 1.53(d), and is subject to the twenty year patent term provisoins of 35 U.S.C. 154(a)(2). --.

<u>Column 3,</u>
Line 54, "sued" should read -- used --.

<u>Column 9,</u>
Line 61, "Channel C" should read -- channel c --.

<u>Column 14,</u>
Line 3, "begun" should read -- begin --.
Line 58, "a image" should read -- an image --.

<u>Column 22,</u>
Line 12, "cable 112," should read -- cable 112, --.

<u>Column 23,</u>
Line 12, "to" should read -- to as --.
Line 52, "a image" should read -- an image --.

Signed and Sealed this

Eleventh Day of May, 2004

JON W. DUDAS
*Acting Director of the United States Patent and Trademark Office*